US012607898B1

(12) United States Patent
Jensen et al.

(10) Patent No.: US 12,607,898 B1
(45) Date of Patent: Apr. 21, 2026

(54) SYSTEMS AND METHODS PROVIDING FREE-SPACE OPTICAL BEAM CONTROL

(71) Applicant: GENERAL ATOMICS AERONAUTICAL SYSTEMS, INC., San Diego, CA (US)

(72) Inventors: Steven Jensen, Santee, CA (US); Adam Geboff, Campbell, CA (US); Jason Higuchi, Temple City, CA (US); Drew DeJarnette, San Diego, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 13 days.

(21) Appl. No.: 18/737,775

(22) Filed: Jun. 7, 2024

(51) Int. Cl.
| | |
|---|---|
| *G02F 1/29* | (2006.01) |
| *G02B 26/08* | (2006.01) |
| *G02B 26/10* | (2006.01) |
| *H04N 23/55* | (2023.01) |
| *H04N 23/58* | (2023.01) |
| *H04N 23/61* | (2023.01) |

(52) U.S. Cl.
CPC ......... *G02F 1/292* (2013.01); *G02B 26/0816* (2013.01); *G02B 26/10* (2013.01); *H04N 23/55* (2023.01); *H04N 23/58* (2023.01); *H04N 23/61* (2023.01)

(58) Field of Classification Search
CPC ..... G02F 1/292; G02B 26/0816; G02B 26/10; H04N 23/55; H04N 23/58; H04N 23/61
See application file for complete search history.

(56) References Cited

U.S. PATENT DOCUMENTS

| | | | |
|---|---|---|---|
| 6,456,419 B1 * | 9/2002 | Winker | ............... G02B 27/0087 349/193 |
| 8,531,646 B2 * | 9/2013 | Shi | .......................... G02F 1/292 359/272 |

(Continued)

OTHER PUBLICATIONS

Fu, Xiaojian, et al.; "Terahertz Bean Steering Technologies: From Phased Arrays to Field-Programmable Metasurfaces"; <https://www.researchgate.net/publication/335044867>; Aug. 2019; 23 pages.

(Continued)

*Primary Examiner* — Timothy R Newlin
(74) *Attorney, Agent, or Firm* — Fitch, Even, Tabin & Flannery LLP

(57) ABSTRACT

Some embodiments provide optical path control systems, comprising: a control circuit; a first optical steering system that induces a first optical path directional adjustment to an optical path within a first angular range; and a solid-state optical steering system induces a second optical path directional adjustment within a second angular range greater than the first angular range; wherein the control circuit is configured to: output first control signaling to control the first optical steering system to induce the first optical path directional adjustment; and output second control signaling to repeatedly control the solid-state optical steering system to change a resultant directional orientation of the optical path between multiple different remote targets based on the first optical path directional adjustment and the second optical path directional adjustment in a pattern over time providing free-space optical transmission and/or reception relative to each of the multiple different targets.

20 Claims, 14 Drawing Sheets

Light Source / Light Detector    1st optical steering system    Solid State steering system

(56) References Cited

U.S. PATENT DOCUMENTS

| | | | | |
|---|---|---|---|---|
| 11,294,061 B1* | 4/2022 | Doerr | | G01S 7/4817 |
| 2007/0070480 A1* | 3/2007 | Mahajan | | G02B 26/0883 |
| | | | | 359/201.1 |
| 2009/0168136 A1* | 7/2009 | Jacobs | | G02F 1/0136 |
| | | | | 359/246 |
| 2012/0081621 A1* | 4/2012 | Dorschner | | G02F 1/292 |
| | | | | 349/1 |
| 2012/0188467 A1* | 7/2012 | Escuti | | G02F 1/1347 |
| | | | | 349/1 |
| 2015/0378242 A1* | 12/2015 | Auxier | | G02B 6/2753 |
| | | | | 385/8 |
| 2017/0018214 A1* | 1/2017 | Black | | H05B 47/10 |
| 2017/0299941 A1* | 10/2017 | Serati | | G02F 1/292 |
| 2018/0292726 A1* | 10/2018 | Frantz | | G02F 1/292 |
| 2019/0075281 A1* | 3/2019 | Hall | | G01S 7/4814 |
| 2019/0107623 A1* | 4/2019 | Campbell | | G01S 7/4865 |
| 2020/0013181 A1* | 1/2020 | Uyeno | | H04N 23/61 |
| 2020/0088849 A1* | 3/2020 | Gimpel | | G02F 1/292 |
| 2020/0271841 A1* | 8/2020 | English | | G02B 5/3016 |
| 2021/0026069 A1* | 1/2021 | Baets | | G02B 27/0087 |
| 2021/0263292 A1* | 8/2021 | Visser | | G02B 23/06 |
| 2022/0326589 A1* | 10/2022 | Ataei | | G02F 1/292 |
| 2023/0168560 A1* | 6/2023 | McManamon | | G02F 1/0136 |
| | | | | 359/316 |
| 2023/0244012 A1* | 8/2023 | Yonemoto | | G02B 5/1833 |
| | | | | 349/201 |
| 2024/0202424 A1* | 6/2024 | Sim | | G03F 7/70633 |

OTHER PUBLICATIONS

Kim, Jihwan, et al.; "Wide-angle, nonmechanical beam steering with high throughput utilizing polarization gratings"; <https://www.researchgate.net/publication/51219757>; Jun. 2011; 5 pages.

Li, Zhi, et al.; "Multi-user accessible indoor infrared optical wireless communication systems employing VIPA-based 2D optical beam-steering technique"; Jun. 14, 2021; Optics Express; https://doi.org/10.1364/OE.427621; 15 pages.

* cited by examiner

Light Source / Light Detector

1st optical steering system

Solid State steering system

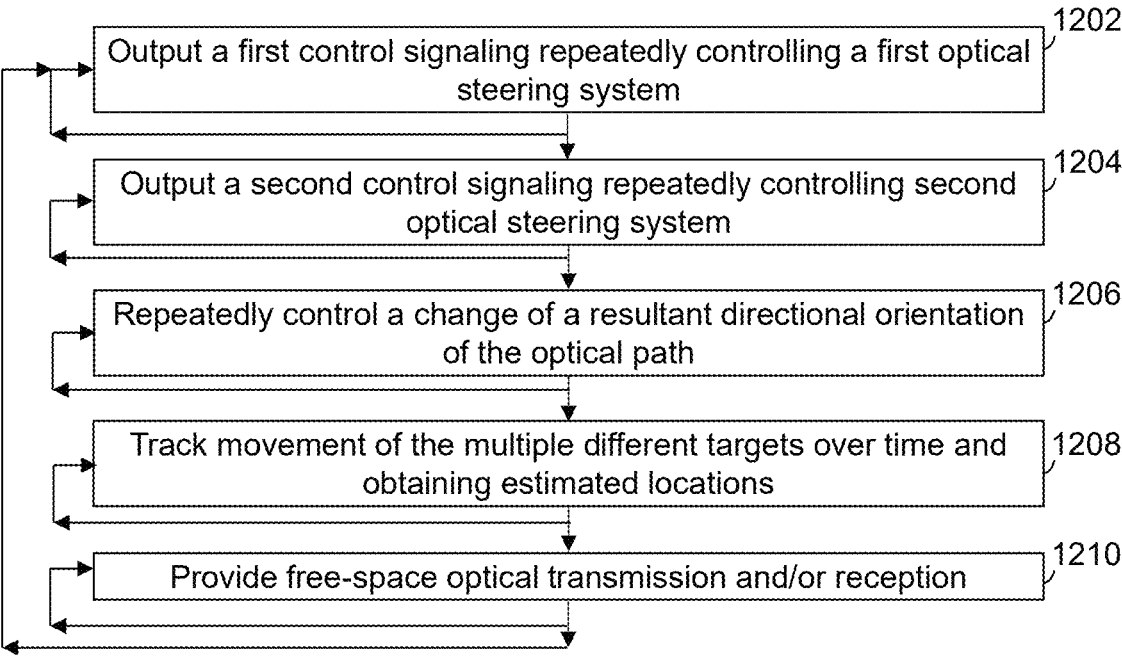

Output a first control signaling repeatedly controlling a first optical steering system ⟍ 1202

Output a second control signaling repeatedly controlling second optical steering system ⟍ 1204

Repeatedly control a change of a resultant directional orientation of the optical path ⟍ 1206

Track movement of the multiple different targets over time and obtaining estimated locations ⟍ 1208

Provide free-space optical transmission and/or reception ⟍ 1210

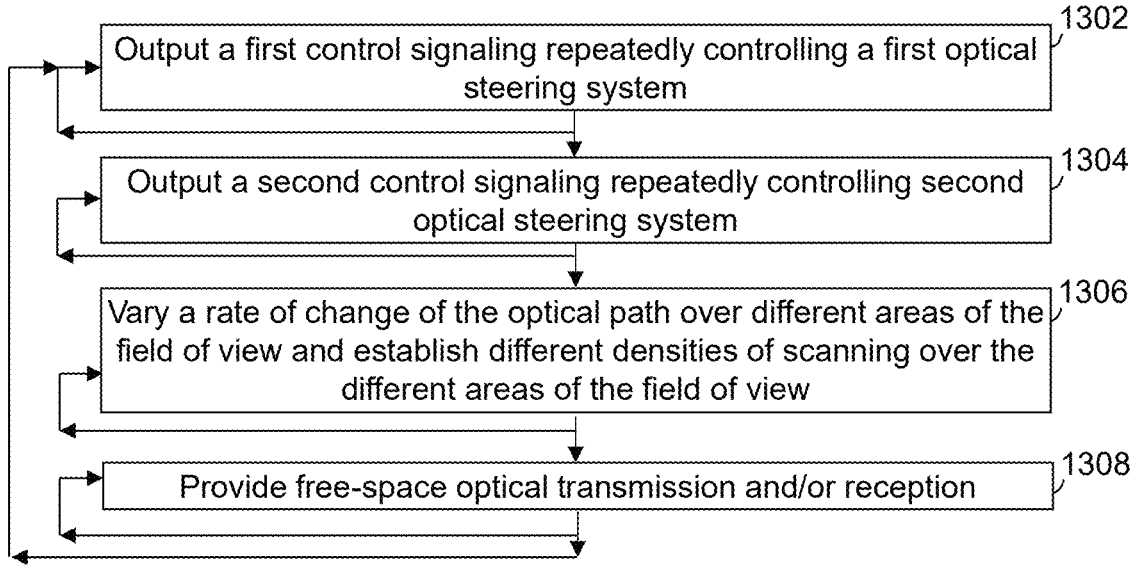

Output a first control signaling repeatedly controlling a first optical steering system ⟍ 1302

Output a second control signaling repeatedly controlling second optical steering system ⟍ 1304

Vary a rate of change of the optical path over different areas of the field of view and establish different densities of scanning over the different areas of the field of view ⟍ 1306

Provide free-space optical transmission and/or reception ⟍ 1308

*FIG. 14*

1400

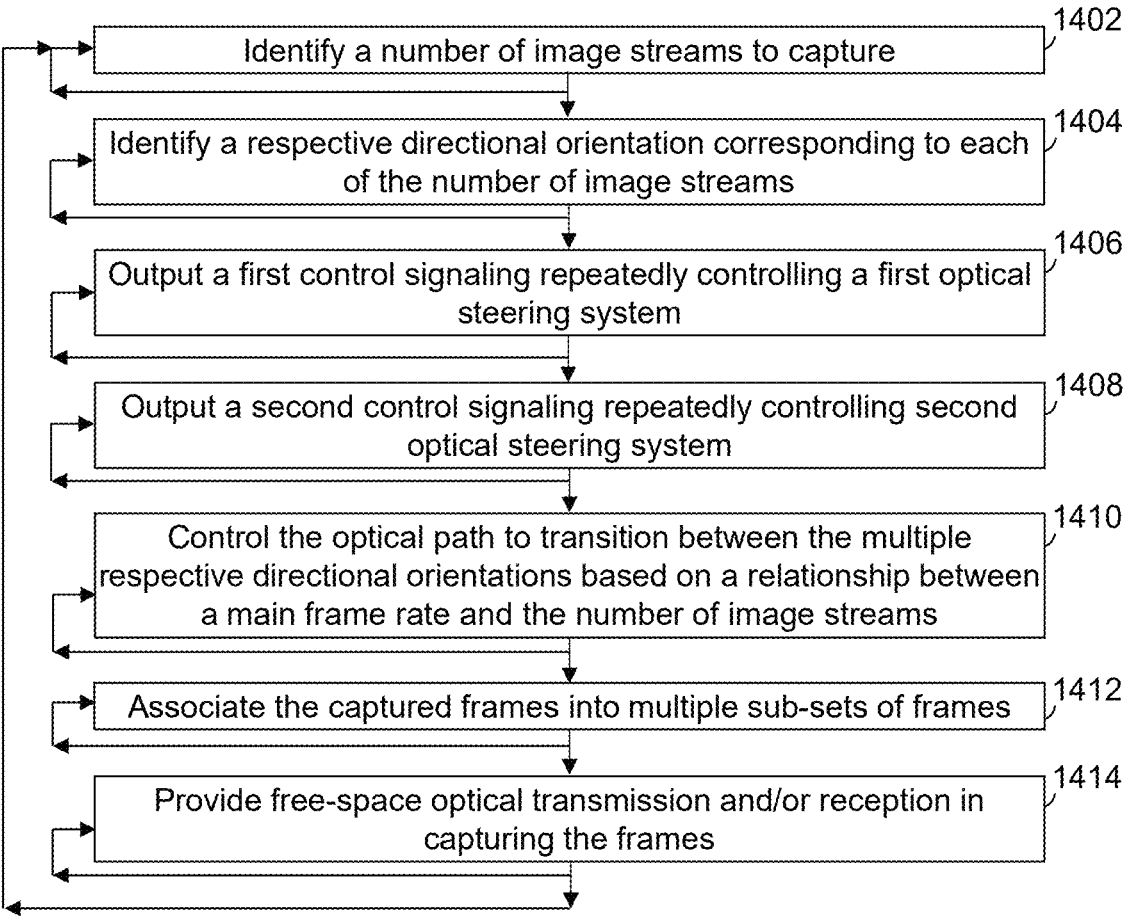

1402   Identify a number of image streams to capture

1404   Identify a respective directional orientation corresponding to each of the number of image streams 1406   Output a first control signaling repeatedly controlling a first optical steering system 1408   Output a second control signaling repeatedly controlling second optical steering system 1410   Control the optical path to transition between the multiple respective directional orientations based on a relationship between a main frame rate and the number of image streams 1412   Associate the captured frames into multiple sub-sets of frames 1414   Provide free-space optical transmission and/or reception in capturing the frames

SYSTEMS AND METHODS PROVIDING FREE-SPACE OPTICAL BEAM CONTROL

TECHNICAL FIELD

This invention relates generally to optical beam control.

BACKGROUND

The use of optical beams has many applications. Free space optical communication, for example, can be very effective. However, the use of free space optical beams can have significant limitations.

BRIEF DESCRIPTION OF DRAWINGS

Disclosed herein are embodiments of systems, apparatuses and methods pertaining to optical communication. This description includes drawings, wherein:

FIG. 12 illustrates a simplified flow diagram of an exemplary process of controlling an optical path, in accordance with some embodiments.

FIG. 13 illustrates a simplified flow diagram of a process of controlling one or more optical paths in accordance with some embodiments.

FIG. 14 illustrates a simplified flow diagram of an exemplary process of controlling one or more optical paths in accordance with some embodiments.

Figure 1:
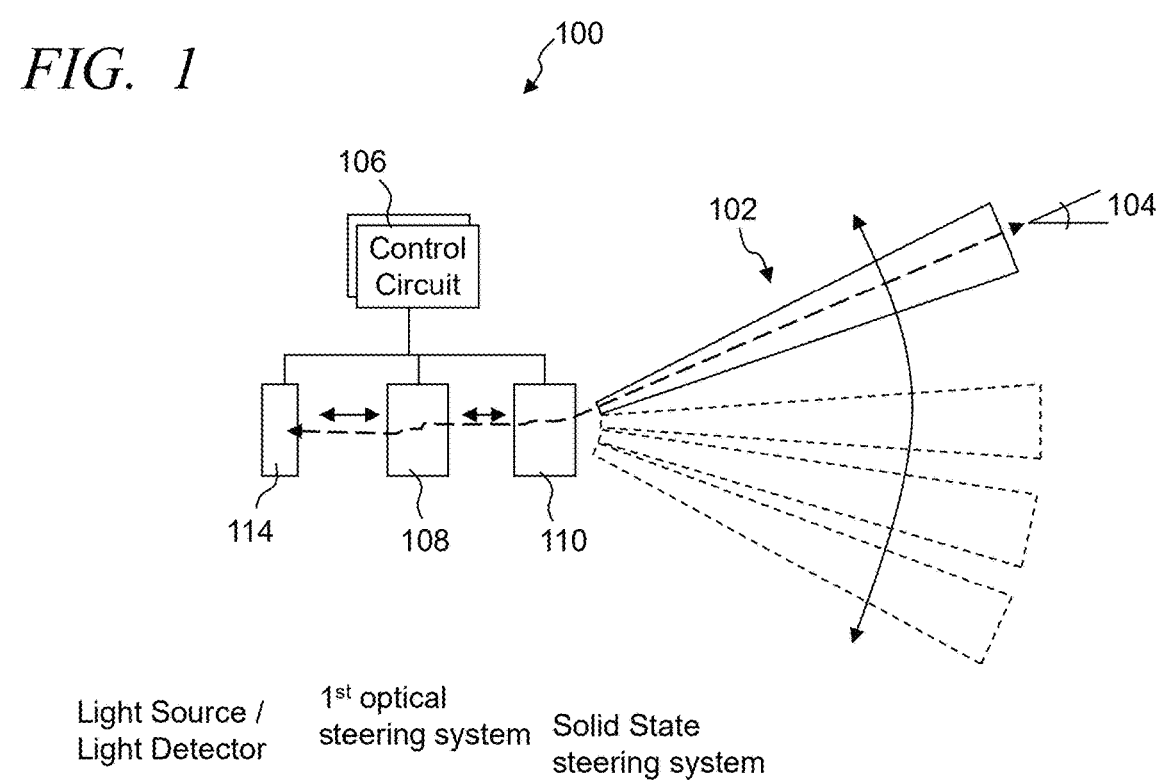
FIG. 1 illustrates a simplified block diagram of an exemplary optical path control system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the invention. Thus, appearances of the phrases "in one embodiment," "in an embodiment," "in some embodiments", "in some implementations", and similar language throughout this specification may, but do not necessarily, all refer to the same embodiment.

Optical communication can be very effective in many different instances and applications. As one non-limiting example, optical communication can greatly reduce the potential for unintended interception when the optical beam of the optical communication is accurately aligned with an intended target, which may be a particular target area or zone, a particular target communication system, and/or other such targets. Many optical communication systems, however, require physical movement of one or more components of the optical communication system at one or both sides of the communication in order to achieve the optical alignment between transmitting system and receiving system. For example, many typical gimballed systems include motors that when activated can induce rotational movement of a turret. Such physical movement can greatly delay communications and in some instances can inhibit the use of optical communication.

Some embodiments, however, provide optical communication systems that can be implemented through solid-state optical systems that enable steering of the communication beam (e.g., laser) while avoiding or limiting mechanical pointing. Further, such systems allow rapidly changing an orientation of the communication beam and/or aperture to provide substantially simultaneous communication between three or more entities, such as using multiplexing (e.g., Time-Division Multiple Access (TDMA)). Some embodiments comprise one or more solid-state steering systems that are controlled to change a direction to transmit to and/or receive from multiple targets at substantially the same time.

Generally speaking, pursuant to various embodiments, systems, apparatuses and methods are provided herein useful to provide at least in part communication. In some embodiments, an optical path control system is provided that comprises a control circuit, one or more first optical steering systems coupled to the control circuit and one or more second optical steering systems, which in some implementations can comprise one or more solid-state optical steering systems, coupled to the control circuit. The first optical steering system can be configured to induce a first optical path directional adjustment to an optical path within a first angular range, and the solid-state optical steering system can be configured to induce a second optical path directional adjustment to the optical path within a second angular range, where the second angular range is typically greater than the first angular range. The control circuit can be configured to output a first control signaling to control the first optical steering system to induce the first optical path directional adjustment to the optical path within the first angular range; and output a second control signaling to repeatedly control the solid-state optical steering system to change a resultant directional orientation of the optical path between multiple different remote targets based on the first optical path directional adjustment and the second optical path directional adjustment in a pattern over time providing free-space optical transmission and/or reception relative to each of the multiple different targets. The placement of the first and second optical steering systems can be switched in some embodiments.

Some embodiments additionally or alternatively provide methods of controlling an optical path, comprising: outputting, by a control circuit, first control signaling repeatedly controlling a first optical steering system in inducing first optical path directional adjustments to an optical path within a first angular range; and outputting, by the control circuit, second control signaling controlling, in cooperation with the controlling of the first optical steering system, a solid-state optical steering system in inducing second optical path directional adjustments to the optical path within a second angular range to repeatedly control a change of a resultant directional orientation of the optical path between multiple different remote targets in a pattern over time based on the first optical path directional adjustment and the second optical path directional adjustment providing free-space optical transmission and/or reception relative to each of the multiple different targets.

FIG. 1 illustrates a simplified block diagram of an exemplary optical path control system 100, in accordance with some embodiments. The optical path control system 100 can be configured to provide optical steering of an optical path 102 within and/or across a relatively wide resultant angular range through the cooperative angular directional adjustments through multiple sequential optical steering systems providing a cumulative angular steering of optical paths and/or apertures. The steering, in some embodiments, can be precisely controlled along intended angular direction 104 relative to the optical path control system 100. The optical path control system 100 can include one or more control circuits 106 that communicatively couple with two or more optical steering systems and/or stages, such as at least a first optical steering system 108 that is optically coupled with at least a second optical steering system 110. The first optical steering system 108 and second optical steering system 110 are cooperatively controlled by the control circuit 106 to control the angular orientation of an optical path 102 and/or aperture along which one or more optical signals can be transmitted and/or received. In some embodiments, for example, one of the first and second optical steering systems can operate as a course steering element providing course angular steering, while the other is operated as a fine steering element providing fine or more precision angular steering. The resulting steering can enable rapid resulting steering of the optical aperture. In some embodiments, the optical path control system 100 includes an optical transmitter/receiver system 114 that can transmit and/or receive the optical signal. The transmitter/receiver system 114 is further typically communicatively coupled with the control circuit 106 and/or a separate control system (e.g., a communication control system). In some embodiments, the system 100 can operate as a compact multifunction optical terminal.

Figure 2:
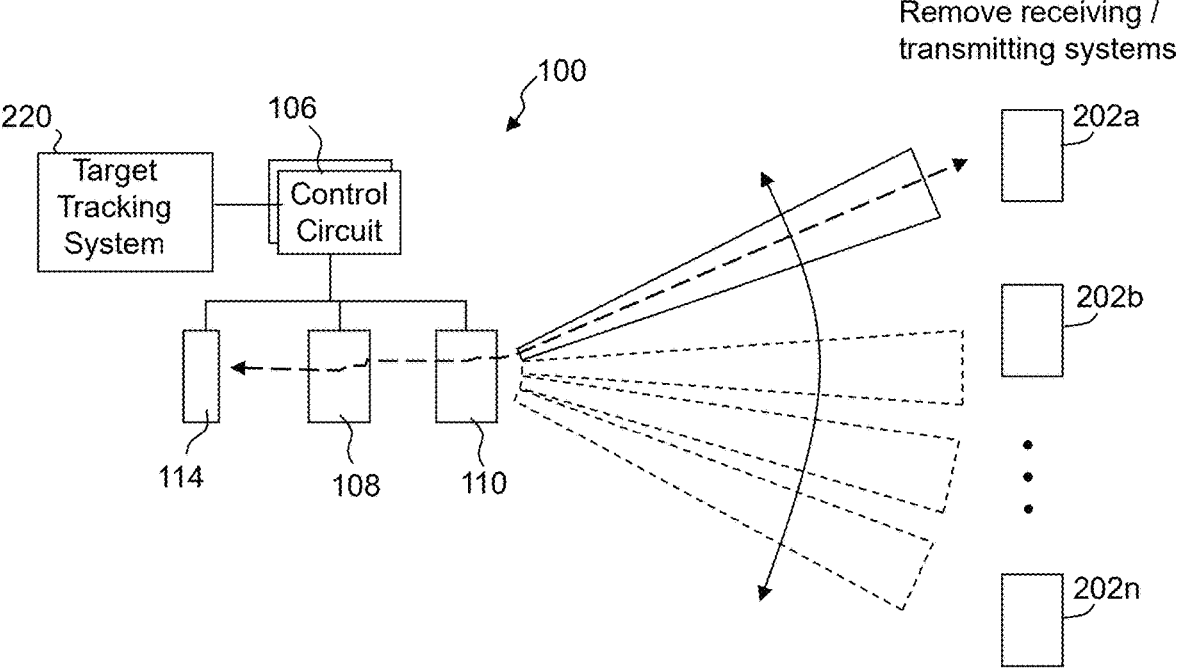
FIG. 2 illustrates a simplified block diagram of an exemplary optical path control system in communication with multiple remote targets or target systems through optical path steering, in accordance with some embodiments.

FIG. 2 illustrates a simplified block diagram of an exemplary optical path control system 100 in communication with multiple remote targets or target systems 202a-202n through optical path steering, in accordance with some embodiments. Referring to FIGS. 1-2, the optical path control system 100 can in some embodiments be configured to provide, in part, rapid steering of one or more optical paths 102 to enable simultaneous optical communication with the multiple different remote target systems 202a-202n. The optical path control system 100, in some embodiments, provides full duplex two-way optical communications between the optical and the multiple remote target systems 202a-202n. The control circuit 106 can control the first optical steering system 108 to induce a first optical path directional adjustment to the optical path 102 within a first angular range, and cooperatively control the second optical steering system 110 to induce a second optical path directional adjustment to the optical path within a second angular range. The combination of the first directional adjustment and the second directional adjustment provides an intended resultant angular adjustment to the optical path 102 enabling precision steering of the optical path. Further, in some embodiments, the first optical steering system 108 and second optical steering system 110 can be implemented through steering systems that enable relatively rapid changes to the angular direction relative to many previous systems. The control circuit 106 can be configured to output a first control signaling, and typically a series of first control signals, to the first optical steering system 108 to control the first optical steering system 108 to induce the first optical path directional adjustment to the optical path 102. Similarly, the control circuit 106 can output a second control signaling or series of second control signals to repeatedly control the second optical steering system 110 to change a resultant directional orientation of the optical path between the multiple different remote target systems 202a-202n based on a cooperative adjustment by the first optical path directional adjustment and the second optical path directional adjustment. Still further, the series of at least the second control signals and/or the first and second control signals can provide repeated control to establish a pattern over time providing free-space optical transmission and/or reception relative to each of the multiple different targets 202a-202n.

Figure 3:
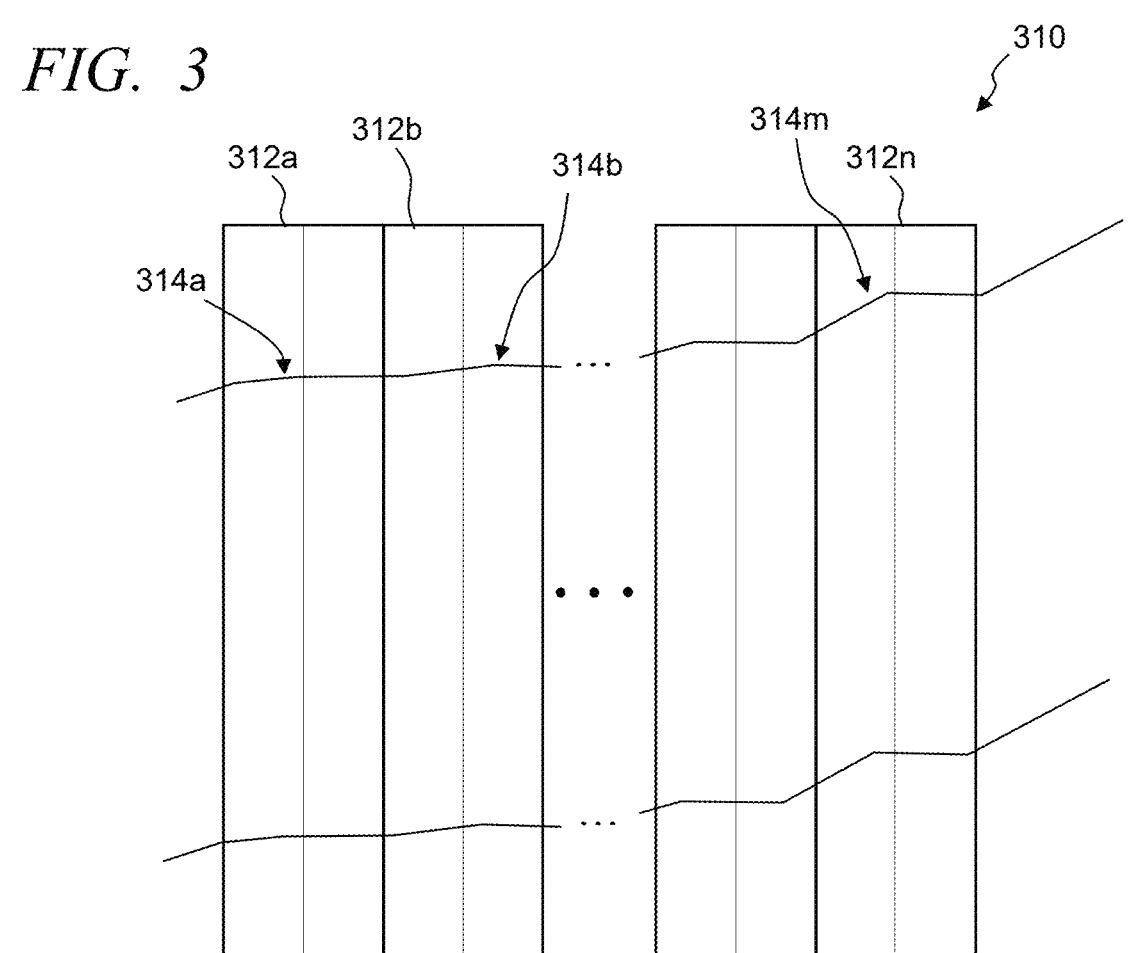
FIG. 3 illustrates a simplified block diagram, cross-sectional view of an exemplary solid-state optical steering system, in accordance with some embodiments.
Figure 4:
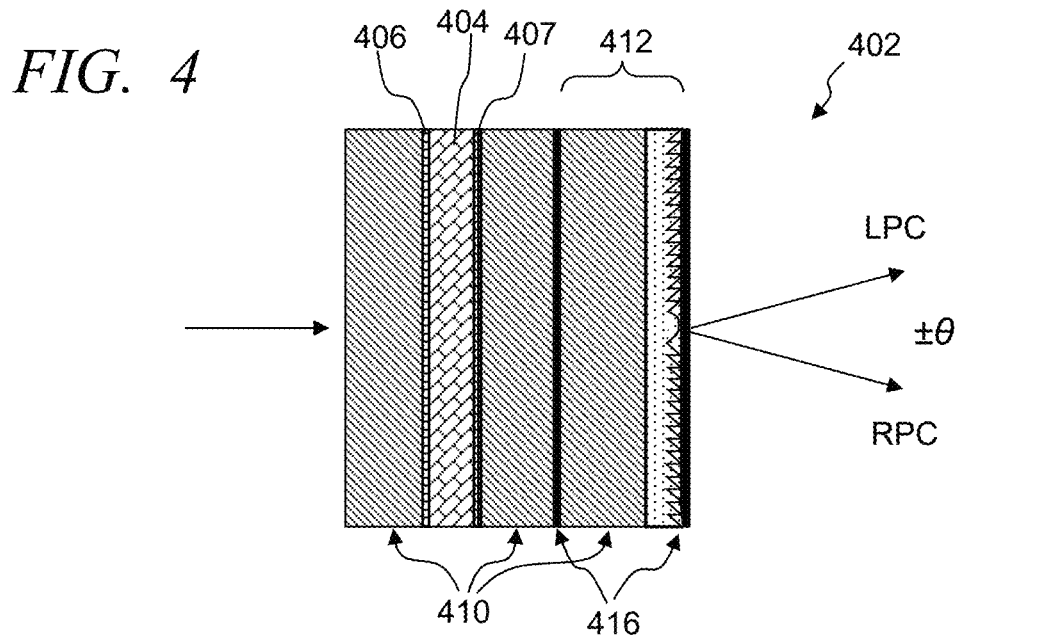
FIG. 4 illustrates a simplified block diagram of an exemplary liquid crystal polarization grating (LCPG), in accordance with some embodiments.
Figure 5:
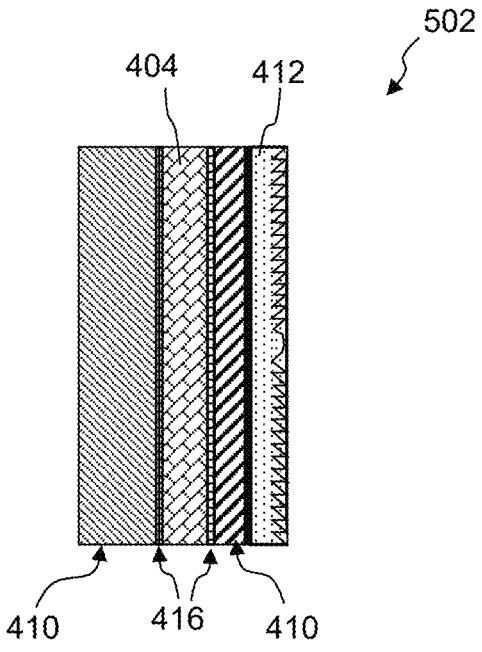
FIG. 5 illustrates a simplified block diagram, cross-sectional view of an exemplary integrated LCPG, in accordance with some embodiments.

In some embodiments, the second optical steering system 110 comprises a solid-state optical steering system and/or a series of two or more solid-state optical steering systems that are collectively controlled to achieve an intended angular control of the optical path 102. FIG. 3 illustrates a simplified block diagram, cross-sectional view of an exemplary solid-state second optical steering system 310 that can be used in the optical path control system 100, in accordance with some embodiments. The second optical steering system 310 can comprise a series of multiple stacked and optically aligned light deflecting systems 312a-312n that are each configured to be independently controlled by the control circuit 106, and cooperatively operated to sequentially implement respective sub-angular adjustments 314a-314m in cumulatively providing the second optical path directional adjustment. In some implementations, one or more of the light deflecting systems 312a-312n can comprise a solid state device. For example, in some embodiments, the second optical steering system 110 can comprises, at least in part, a series of multiple optically aligned liquid crystal polarization grating (LCPG) each coupled with and separately controlled by the control circuit 106. The control circuit 106 can be configured to separately control one or more of the multiple LCPGs to each implement a respective sub-angular adjustment 314 with a cumulative effect through the solid-state second optical steering system 310 to implement the second optical path directional adjustment. FIG. 4 illustrates a simplified block diagram of an exemplary LCPG 402, in accordance with some embodiments. The LCPG can include one or more liquid crystals 404 cooperated with electrodes 406-407, and in some embodiments substrates 410 (e.g., glass substrates), and further cooperated with a polarization grating (PG) 412. One or more of the sub-elements of the LCPG 402 can be secured together, for example, using an index matching epoxy 416. The LCPG 402 can be controlled to achieve an angular adjustment between an angular range (e.g., ±0). The inclusion of the polarization grating 412 enables the beam to be polarized consistent with an intended polarization (e.g., left circular polarization (LPC), right circular polarization (RPC), etc.). FIG. 5 illustrates a simplified block diagram, cross-sectional view of an exemplary integrated LCPG 502, in accordance with some embodiments, that can be utilized within an optical path control system 100. The integrated LCPG 502 integrates the polarization grating 412 to improve optical efficiency.

Figure 6:
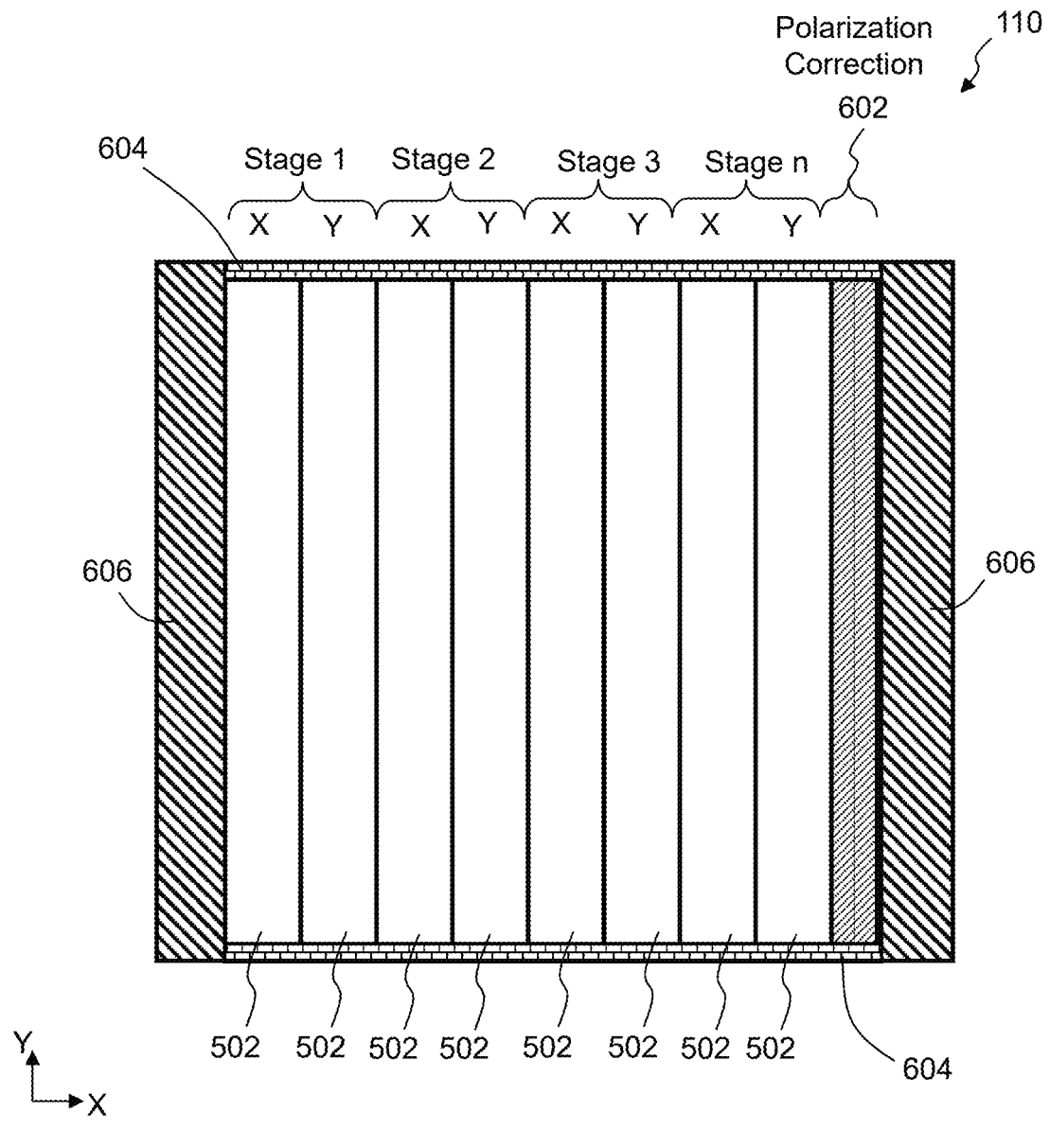
FIG. 6 illustrates a simplified block diagram, cross-sectional view of an exemplary optical steering system, in accordance with some embodiments.

FIG. 6 illustrates a simplified block diagram, cross-sectional view of an exemplary second optical steering system 110, in accordance with some embodiments. The second optical steering system 110 can comprise a series of stacked and optically aligned light deflecting sub-systems. In some embodiments, at least one and typically multiple of the light deflecting sub-systems can comprise a solid state device, such as LCPGs (e.g., LCPGs 502) each configured to be controlled and cooperatively operated by the control circuit 106 to sequentially implement respective sub-angular adjustments in cumulatively providing the second optical path directional adjustment. Further, in some embodiments, the LCPGs 502 can be cooperative operate in stages (e.g., pairs of LCPGs 502 providing respectively for X axis angular steering and Y axis angular steering) providing the sub-angular adjustments, which can result in multiple geometrically increasing deflections (e.g., stage 1 implementing +/−1.875°; stage 2 implementing +/−3.75°; stage 3 implementing +/−7.5°; stage 4 implementing +/−15.0°) along an X-axis and mirror those in a Y axis via a series of, for example eight (8) substages. As a further example, four LCPGs 502 can be configured in an X-axis orientation to provide a possibility of 16 deflection angles in the X direction, and four LCPGs (rotated 90°) configured in a Y-axis orientation to provide a possibility of 16 deflection angles in the Y direction, which can be rapidly controlled to provide cumulative rapid steering of a beam over the full angular field. The control of cumulative angular deflection provided through the second optical steering system 110 (which may be a relatively course angular steering), in cooperation with the further control of the optical steering through the first optical steering system 108 (which in some embodiments may provide a finer angular steering) can achieve in some embodiments additional deflection angles and/or a continuous angular steering between the course angular steering achieved through the second optical steering system 110. The first optical steering system 108 can be implemented using and/or can include one or more spatial light modulators, one or more fast steering mirrors, one or more microelectromechanical steering mirrors, one or more fast steering prisms (FSP), one or more Risley prisms (RP) or prism pairs, one or more deformable mirrors (DM), one or more digital light projectors (DLP), one or more Tip-Tilt arrays (TTA), one or more spatial light modulators (SLM), one or more acousto-optic modulator (AOM), other such systems, or a combination of two or more of such systems. For example, the first optical steering system 108 can comprise a fast steering mirror system coupled with and controlled by the control circuit 106 to cause physical movement of a mirror element consistent with the one or more control signalings from the control circuit 106. The optical steering system 110 can be implemented with substantially any number of LCPGs that can be cooperatively controlled to achieve intended angular deflections.

Some embodiments include a polarization correction stage 602 cooperated with and optically aligned with the series of the multiple optically aligned LCPGs 502 producing a standardized polarization of a light beam emitted along the optical path. With some implementations, an output polarization can be important (e.g., some laser communication systems and/or LIDAR system rely on the beam being in a certain polarization state). As such, some embodiments include the polarization correction stage 602 to establish substantially a consistent polarization output state regardless of the resultant output angle. The polarization stage 602 can be implemented, in some embodiments, with one or more liquid crystal cells that typically do not include a grating.

Further, the second optical steering system 110 in some embodiments includes one or more temperature control systems 604 that can apply heating and/or cooling to one or more of the LCPGs 502, the polarization correction stage 602 and/or other components of the optical steering system 110. For example, the temperature control system 604 can be communicatively coupled with the control circuit 106 or a separate temperature control circuit that can apply heat to and/or pull heat from one or more of the LCPGs 502 and/or the polarization correction stage 602 to improve the control of produced polarization, angular adjustments, switch feed rates at which polarization changes can be implemented, rates at which angular adjustments can be changed, and/or other such effects. One or more temperature sensors may be coupled with the control circuit 106 and/or temperature control system of the second optical steering system 110 to allow monitoring of the temperature of one or more of the LCPGs 502, the polarization correction stage 602 and/or other components to the second optical steering system 110 and control the temperature control system 604 (e.g., apply heat).

In some embodiments, the second optical steering system 110 can include one or more structures cooperated with the LCPGs 502 and/or polarization correction stage 602 to enhance the structural integrity, positioning, optical alignment and/or other such factors. For example, warping and/or twisting one or more of the LCPGs may occur. As such, some embodiments include one or more optical caps 606 at one or more of the ends of the stack and/or interspersed between the LCPGs to help constrain and/or maintain the flat state and/or inhibit warping, twisting and/or other such adverse effects. For example, the optical caps 606 can comprise relatively rigid and/or relatively thick materials or set of materials, which are optically transparent at the one or more optical wavelengths intended to be transmitted through the second optical steering system 110, such as but not limited to glass, plastic, silicon, other such materials, or a combination of two or more of such materials.

Figure 7:
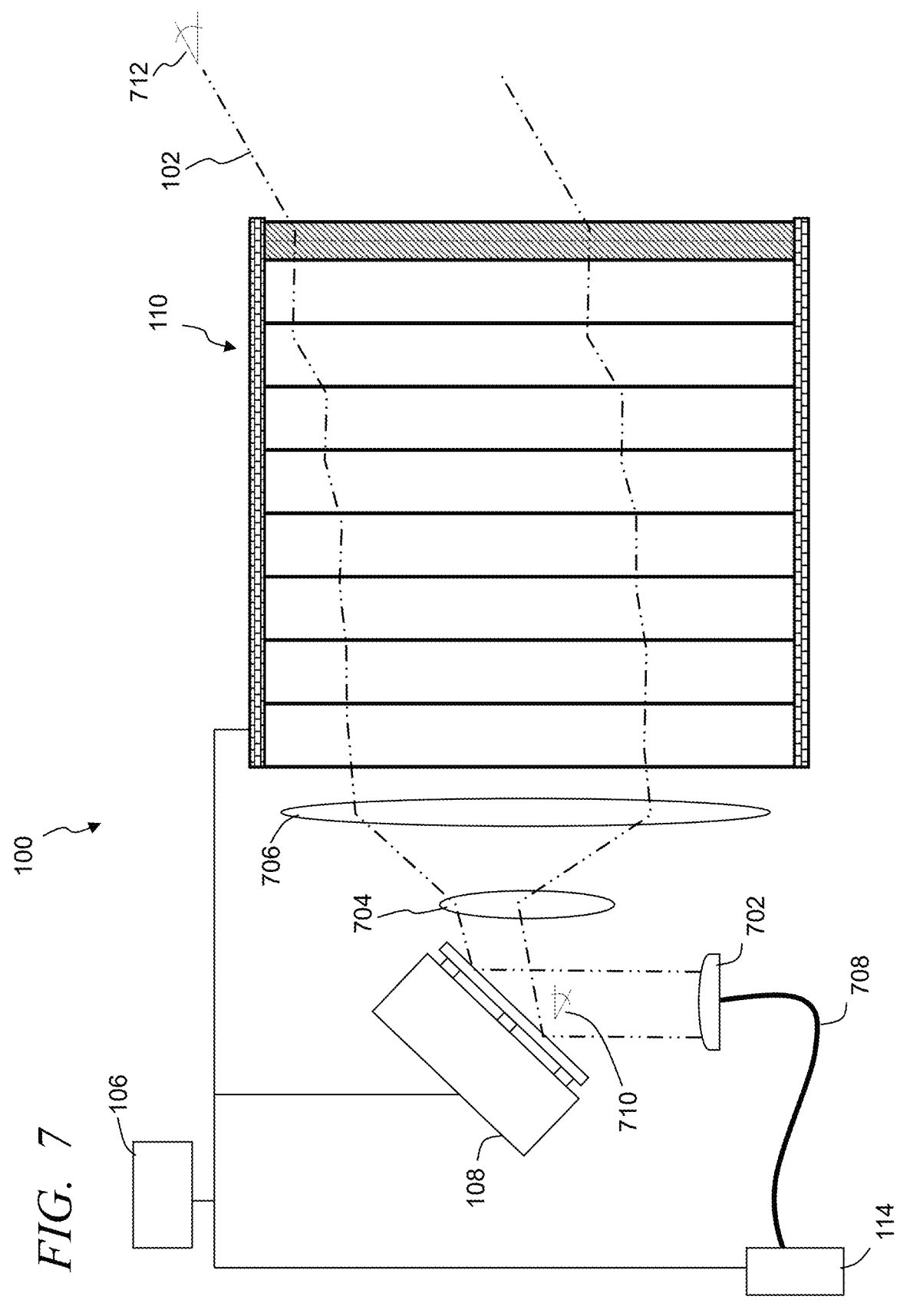
FIG. 7 illustrates a simplified block diagram of an exemplary optical path control system, in accordance with some embodiments.

FIG. 7 illustrates a simplified block diagram of an exemplary optical path control system 100, in accordance with some embodiments. The control circuit 106 communicatively couples with the first optical steering system 108, the second optical steering system 110, and the optical transmitter/receiver system 114. One or more optical components may be included within the optical path, such as but not limited to optical fiber collimators 702, lenses 704, 706, prisms, telescopes, fiber optic(s) 708, other such optical components, or a combination of two or more of such optical components. In some embodiments, the first optical steering system 108 can comprise a fast steering mirror or other such subsystem that can control an intermediate angular deflection 710 between the first optical steering system 108 and the second optical steering system 110. The multiple angular changes implemented by the first optical steering system 108 and the second optical steering system 110, as controlled by the control circuit 106, cumulatively establishes the resultant angle 712 of the optical path 102 and/or beam. While FIG. 7 shows the first optical steering system 108 positioned between the optical transmitter/receiver 114 and the second optical steering system 110, in some embodiments the positioning of the first optical steering system 108 and second optical steering 110 can be reversed with the second optical steering 110 positioned between the optical transmitter/receiver system 114 and the first optical steering system 108.

In some embodiments, the available angular adjustments or field of view provided by the first optical steering system 108 can be greater than an available sub-angular adjustment or sub-field of view of at least one of the stacked light deflecting systems 312, 502 (e.g., a first LCPG of a stack of LCPGs) of the second optical steering system 110, and in some instances is greater than respective sub-fields of view or available sub-angular adjustments of each of the stacked LCPGs of a second solid-state optical steering system. The second optical steering system 110, in some embodiments, comprises the multiple light deflecting systems 312a-312n, 502 that each provide a respective discrete available subangular adjustment range or field of view, which may be the same for each of the light deflecting systems or different for two or more of the light deflecting systems (e.g., an angular deflection of +/−n degrees), which can collectively provide a cumulative second available angular adjustment range or field of view. The first optical steering system 108, in some embodiments, can provide a first available angular adjustment range (e.g., an angular adjustment range of +/−m degrees) or field of view. The control circuit 106 can determine and/or receive an intended angular directional orientation and cooperatively control the first and second optical steering systems to achieve, through the cumulative adjustments, the intended resulting angular directional orientation of the optical path 102 over a resultant available angular adjustment range (e.g., an angular adjustment range of +/−d degrees) with greater precision alignment along an intended angular direction. In some implementations, resultant available angular adjustment range is greater than would be achieved by the first optical steering system 108 or the second optical steering system 110 individually.

Some embodiments enable optical signal transmission and/or communication with two or more different targets 202 and/or target locations or areas through the control of the steering of the optical path 102 or beam to repeatedly transitions between two more optical paths aligned with the intended two or more different targets 202. This precision directional control in rapid succession enables multiple different applications including, for example but not limited to, substantial simultaneous free space optical communications with multiple communicating targets, free space optical communication mesh networking, variable and/or adaptive density Laser Imaging, Detection and Ranging (LIDAR) of different regions of an area, multi-view image capture over multiple areas, video capture over multiple areas, and/or other such applications. The control circuit 106 can be configured to repeatedly control the first optical steering system 108 and/or the second optical steering system 110 over time based on one or more patterns. An example of a pattern may include a time division rate based at least in part on a number of the multiple different targets 202 causing a transition of the resultant directional orientation of the optical path 102 to transition between the multiple different targets. Again, the targets may be an area of an object, an area of free space, an intended communication system, etc. The repeated transition of the optical path can be used at least in part to establish free-space optical transmission and/or reception according to a time division rate with the multiple different targets 202. The control circuit configured to output the first control signaling and/or the second control signaling, in repeatedly controlling the first optical steering system and/or the second optical steering system, to transition the optical path in an intended order (e.g., sequentially) between each of the multiple different remote targets over a frame consistent with the time division rate and repeating the sequential transition over multiple frames providing effectively simultaneous transmission and/or reception with the multiple different remote targets.

For example, some embodiments provide effectively simultaneous optical communication two or more targets 202 through time division transitions between the two or more targets, by repeatedly transitioning between the two or more targets as some or all of communication bursts are transmitted during each of a series of transmission frames. As described above, and further below, the control circuit can control one or both of the first optical steering system 108 and the second optical steering system 110 to change a resultant directional orientation of the optical path 102 between multiple different remote targets 202a-202n in a pattern over time based on the first optical path directional adjustment and the second optical path directional adjustment providing free-space optical transmission and/or reception relative to each of the multiple different targets 202a-202n. Such communication can include, for example but not limited to, optical intersatellite link communication, vehicle to vehicle communication, air to ground communication, air to sea communication, and/or other such communications. Further, the optical path control system 100 enables such communications via non-mechanical beam steering through multiple sequential steering stages in transmitting and/or receiving communications.

Figure 8:
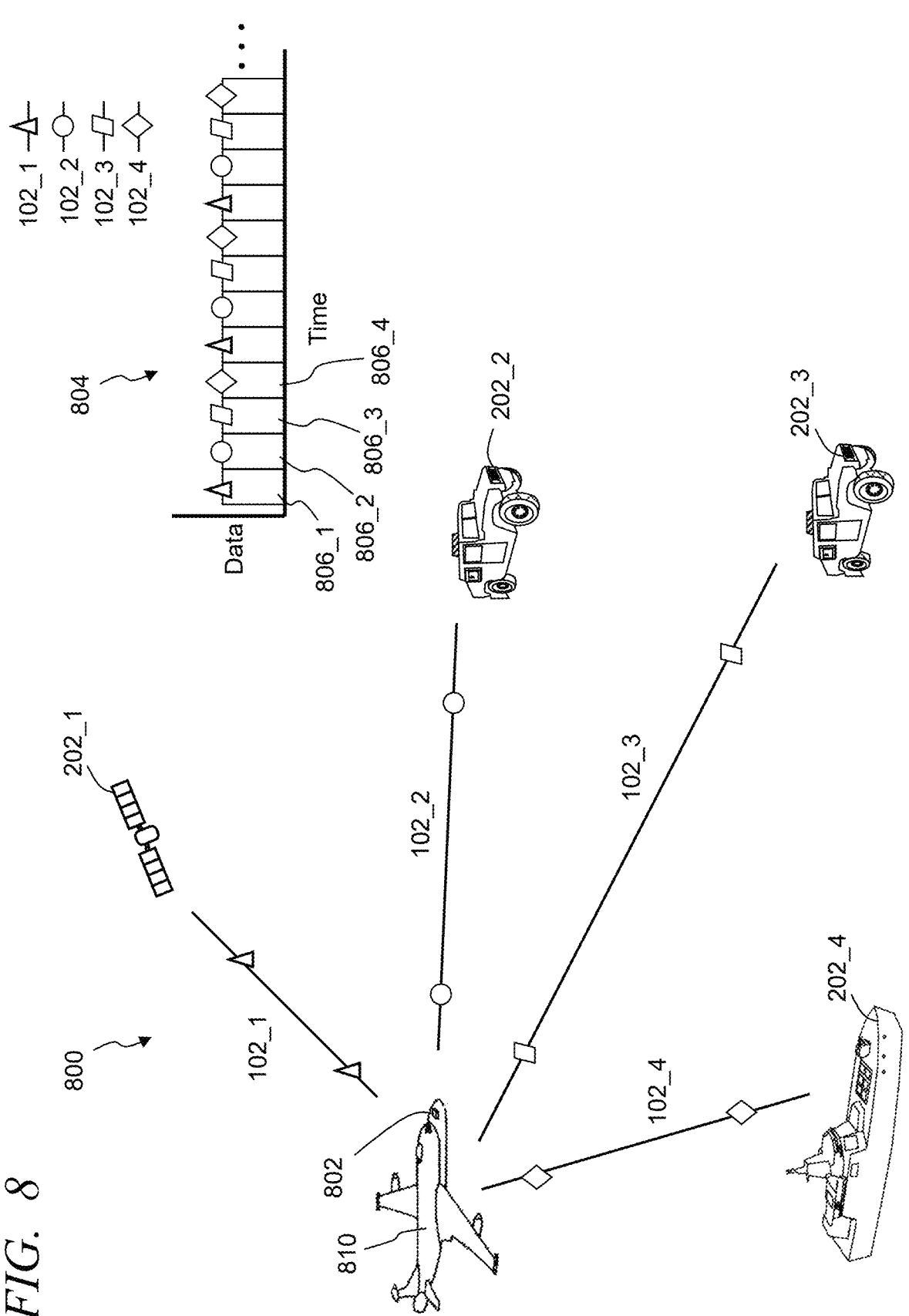
FIG. 8 illustrates a simplified block diagram of an exemplary free-space optical communication system with at least an exemplary first communication system in communication with multiple remote exemplary optical target communication systems using free-space optical communication, in accordance with some embodiments.

FIG. 8 illustrates a simplified block diagram of an exemplary free-space optical communication system 800 with at least an exemplary first communication system 802 in communication with multiple remote exemplary optical target communication systems 202_1-202_4 using free-space optical communication, in accordance with some embodiments. The optical communication system 800 can include one or more optical path control systems 100 with the control circuit 106 controlling the transition of the optical paths 102_1-102_4 between the remote optical target systems 202_1-202_4 according to a defined timing sequence 804. Similarly, one or more of the remote target systems 202_1-204_4 may similarly include an optical path control system 100, or other relevant optical communication system. The control circuit 106 can control the first optical steering system 108 and/or the second optical steering system 110 according to the timing sequence 804 to sequentially and repeatedly transition the optical path between two or more of the target systems 202. The timing sequence 804 can be configured according to one or more factors such as, but not limited to, an amount of data to be communicated, number of targets, interference, changing targets and/or changing numbers of targets, number of secondary targets one or more of the targets are communicating with, other such factors, or a combination of two or more of such factors. For example, a timing sequence 804 may transition between the four targets according to an equal time divisions, another timing sequency may double a time division between the optical path control system 100 and a first target 202_1 (e.g., a satellite with one or more optical communication systems, which may include one or more optical path control system 100 and/or other optical communication systems), versus the corresponding time divisions with the other three targets 202_2-202_4, while yet another timing sequence may control the optical paths to have a first time division 806_1 with the first target 202_1, a second time division 806_2 with a second target 202_2 that is half the duration of the first time division 806_1, and a third time division 806_3 and a fourth time division 806_4 that are a quarter of the duration of the first time division. Substantially any time division and/or durations of time divisions can be applied. Similarly, the time division is not limited to sequentially transitioning between the targets. For example, the optical path may transition from first target 202_1, to the second target 202_2, back to the first target 202_1, to the fourth target 202_4, to the first target 202_1, to the second target 202_2, to the first target 202_1, to the third target 202_3, to the fourth target 202_4, etc. As introduced above, the optical path control system 100 can transmit, receive or transmit and receive during any one of the time divisions 806_1-806_4. As such, each optical path 102 can be unidirectional or bidirectional.

In some embodiments, the first communication system 802 can be or can include, for example, the communication system of one or more of FIGS. 1, 2 and 7, and can include one or more optical path control systems 100. The control circuit 106 of the first communication system 100, in some embodiments, can be configured to repeatedly control a first optical steering system and/or the second optical steering system over time based on the pattern that comprises a time division rate, which in some instances is at least in part based on a number of the multiple different targets 202_1-2024 causing a transition of the resultant directional orientation of the optical path 102 to transition between the multiple different targets and establishing the free-space optical transmission and/or reception according to the time division rate with the multiple different targets. For example, when a number of targets is five (5) targets, the time division rate, in some instances, may be an equal division of a communication frame (e.g., 1 ms frame), which would provide for approximately a 0.2 ms time division rate or dwell time (minus an acquisition time, revisit time and/or other such non-communication times), for each of the five targets during which the free-space optical path 102 is angularly adjusted to aligned with a successive one of the respective five targets. During each time division, information can be transmitted and/or received to and/or from the respective one of the targets. Often, a portion of a communication is sent during a time division 806 with a complete communication being communicated over a set of two or more of the time divisions across multiple communication fames, enabling the simultaneous communication with the multiple different targets over time each receiving a relevant portion of the respective communications over subsequent time divisions.

Referring to at least FIGS. 1-2 and 8, in some implementations, one or more of the targets 202 may be moving and/or the optical path control system 100 may be moving relative to one or more targets. Some embodiments further include one or more target tracking systems 220 that couple with and/or are implemented at least partially within the control circuit 106. The target tracking system can track one or more of the targets in order to continue to track a respective position of the one or more targets relative to the optical path control system 100. In some embodiments, the tracking system can be configured to track movement one or more of the different targets 202 over time and communicate estimated locations of each of the multiple different remote targets to the control circuit and/or a separate system. The control circuit, in repeatedly controlling one or both of the first optical steering system 108 and the solid-state second optical steering system 110, can determine over time optical path refinements based on changes in the estimated locations in optically aligning the optical path with the respective multiple different remote targets over time. In some embodiments, the tracking system 220 can implement a pointing-acquisition and tracking sequence by at least in part maintaining a historical path that each target has traveled.

When the optical path 102 is shifted or moved off of a particular target, the tracking system and/or control circuit can project the linear path that the target was on (in terms of direction, speed, etc.) over the relatively short duration that the optical path 102 is directed away from that target. When the optical path is cycled back to the particular target, the tracking system and/or control circuit utilizes the projected, estimated location of the target, adjust the optical path and perform a relatively small area search pattern to find the particular target. The search pattern can be substantially any search pattern, such as spiraling from an estimated target location, serpentine, rastering, sub-dividing the relatively small area and spiraling or serpentine within subareas, other such searching or a combination of two or more of such searching patterns. Upon detecting the location of the particular target, the control circuit and/or tracking system can lock onto the particular target and is able to continue to perform continuous tracking for at least a remainder of a corresponding division rate duration or dwell time, and to implement communication and/or perform other functions (e.g., LIDAR, . . . ) during the remainder of the division rate duration. Some embodiments additionally or alternatively employ known pointing, acquisition and tracking software in controlling one or more of the multiple sequential optical steering systems.

Figure 9:
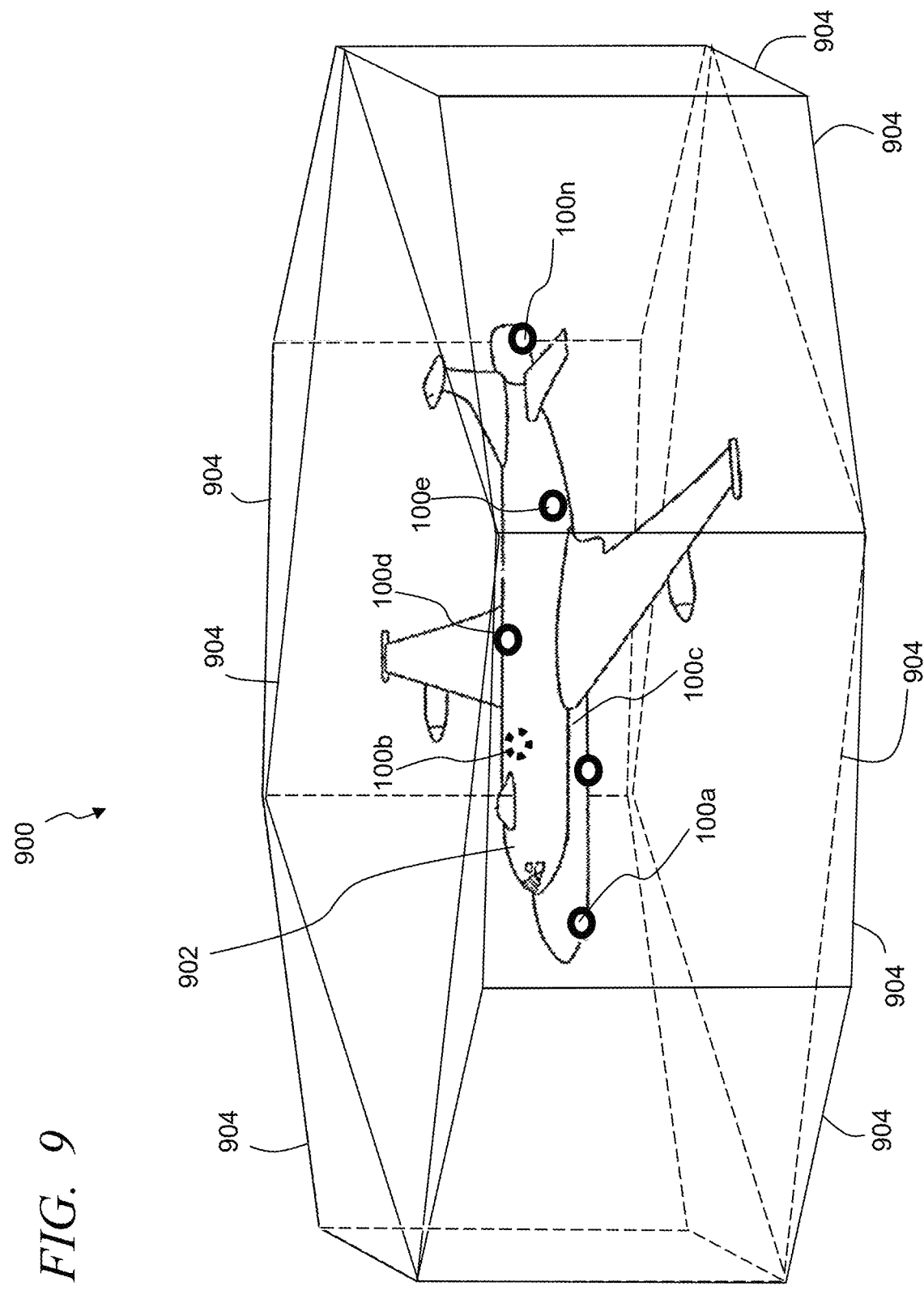
FIG. 9 illustrates a simplified block diagram of an exemplary communication system, of an exemplary vehicle, in accordance with some embodiments.

While FIG. 8 shows a first vehicle 810 with a single optical path control system 100, in some embodiments a communication system and/or vehicle may include multiple different optical path control systems 100 that can be oriented to establish respective zones of optical communication. FIG. 9 illustrates a simplified block diagram of an exemplary communication system 900, of an exemplary vehicle 902, comprising multiple optical path control systems 100a-100n, in accordance with some embodiments. Two or more of the optical path control systems 100 can be oriented to establish different areas or zones 904 of communication, scanning, imaging, other such actions or a combination of such actions, about one or more areas of the vehicle. The optical path control systems 100, in some embodiments, can be positioned at multiple different locations within and/or on the vehicle 902 to enable optical communication, scanning, imaging, or the like 360° horizontally and/or 360° vertically about the vehicle. Additionally or alternatively, a vehicle may include one or more optical path control systems 100 that are further incorporated within and/or cooperated with a gimbal system, turret system, and/or other such system that enables two dimensional and/or three dimensional movement of the optical path control system 100 about one or more axes.

In some embodiments, an optical path control system 100 can comprise a control circuit 106 that communicatively couples with multiple optical antenna systems or optical antenna systems that each comprise a respective first optical steering system 108 and second optical steering 110, that are each respectively controlled by the control circuit. As such, one or more control circuits may each couple with multiple optical antenna systems. Additionally or alternatively, one or more optical transmitter/receiver system 114 may be optically coupled with two or more of the optical antenna systems, such as through respective one or more fiber optics. A control circuit can control the optical transmitter/receiver system 114 to transmit and/or receive signals to and/or from the respective optical antenna systems. For example, a single control circuit 106 can couple with multiple optical antenna systems distributed throughout the vehicle 902 to collectively receive and/or transmit information via the multiple different optical antenna systems.

Figure 10:
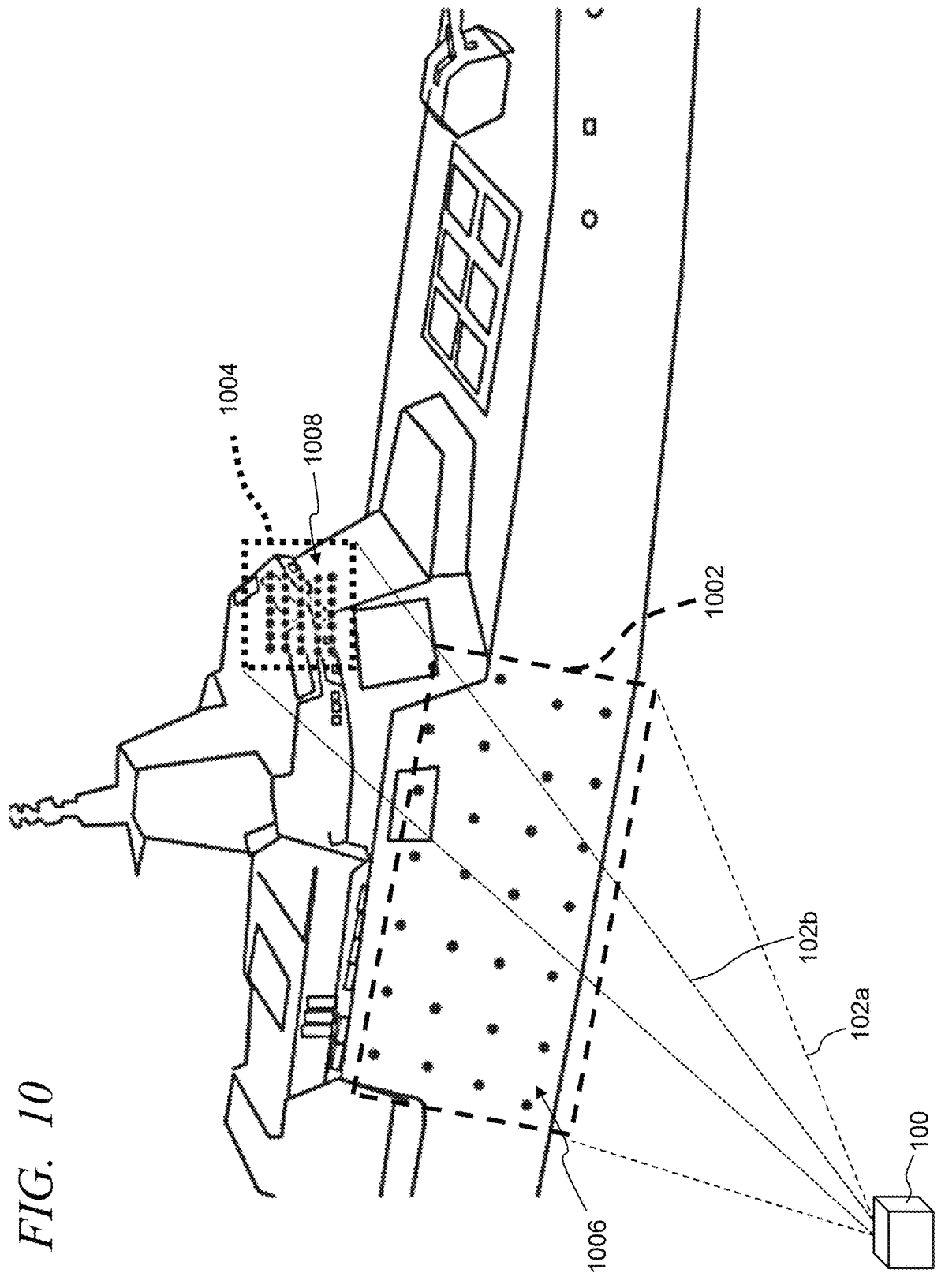
FIG. 10 illustrates a simplified block diagram of an exemplary optical path control system implementing a LIDAR function scanning multiple areas, in accordance with some embodiments.

The optical path control system 100, in some embodiments, can be utilized to perform functions other than and/or in addition to communications. For example, in some embodiments, the optical path control system 100 can be utilized to perform adaptive density scanning, such as in implementing some or all of a Laser Imaging, Detection and Ranging (LIDAR) system. FIG. 10 illustrates a simplified block diagram of an exemplary optical path control system 100 implementing a LIDAR function scanning multiple areas 1002, 1004, in accordance with some embodiments. The areas 1002, 1004 may correspond to different areas of a single target, may correspond to different targets, may correspond to multiple different areas of each of multiple targets. Further, the ability to control the optical path 102a, 102b enables the optical path control system 100 to apply varying sample density scans over the multiple different areas 1002, 1004, and/or control sampling densities for different fields of view. For example, the control circuit 106 may control the scan density over a first area 1002 to have a first density or frequency, while adjusting the density to a second density or frequency that is different than the first density over a second area 1004 (e.g., to a higher density concentration than the first density). Many previous LIDAR systems relied on fast spinning mirrors, fast spinning lenses and/or other such rapid movement that cannot be rapidly changed, at least, due to inertia. As such, these previous LIDAR systems are restricted to single density scans, or relatively very slow scanning. Alternatively, the optical path control system 100 can implement high speed, varying density scans through dynamic control of electronic steering without inertia interfering with the rapid change in scan density. The optical path control system 100 can provide rapid changes in frequency spatial scanning over different regions of a field of view and/or a target. In some embodiments, the optical path control circuit can control imaging to provide foveated imaging, foveated LIDAR and/or other such variable resolution over different areas of a target and/or one or more fields of view.

In some embodiments, the control circuit 106 of the optical path control system 100 and/or an external system may detect a potential area of interest while applying the first density scan, and in response to the detection of the potential area of interest (e.g., a communications system, a weapons system, a vehicle versus lack of vehicle, movement versus lack of movement, etc.), can adjust the density to the second density scan (or other relevant density). In other embodiments, the varying density may, in part, be predefined, while still allowing adjustments in response to one or more factors (e.g., detecting an area of interest, an unexpected change, a detected change in scan quality, one or more signal to noise thresholds, etc.). As such, the control circuit, in repeatedly controlling the first optical steering system 108 and/or the solid-state second optical steering system 110, can in some embodiments be configured to output the first control signaling and/or the second control signaling to transition the optical path 102 to travel over a distance field of view while varying a rate of change of the optical path over different areas 1002, 1004 of the field of view to establish different densities of scanning over the different areas of the field of view (e.g., relatively low frequency scanning 1006, versus higher frequency scanning 1008). Accordingly, the optical path control system 100 can in some embodiments enable variable rate sampling based on scene spatial frequency and/or intended concepts of operations (CONOPS).

Figure 11:
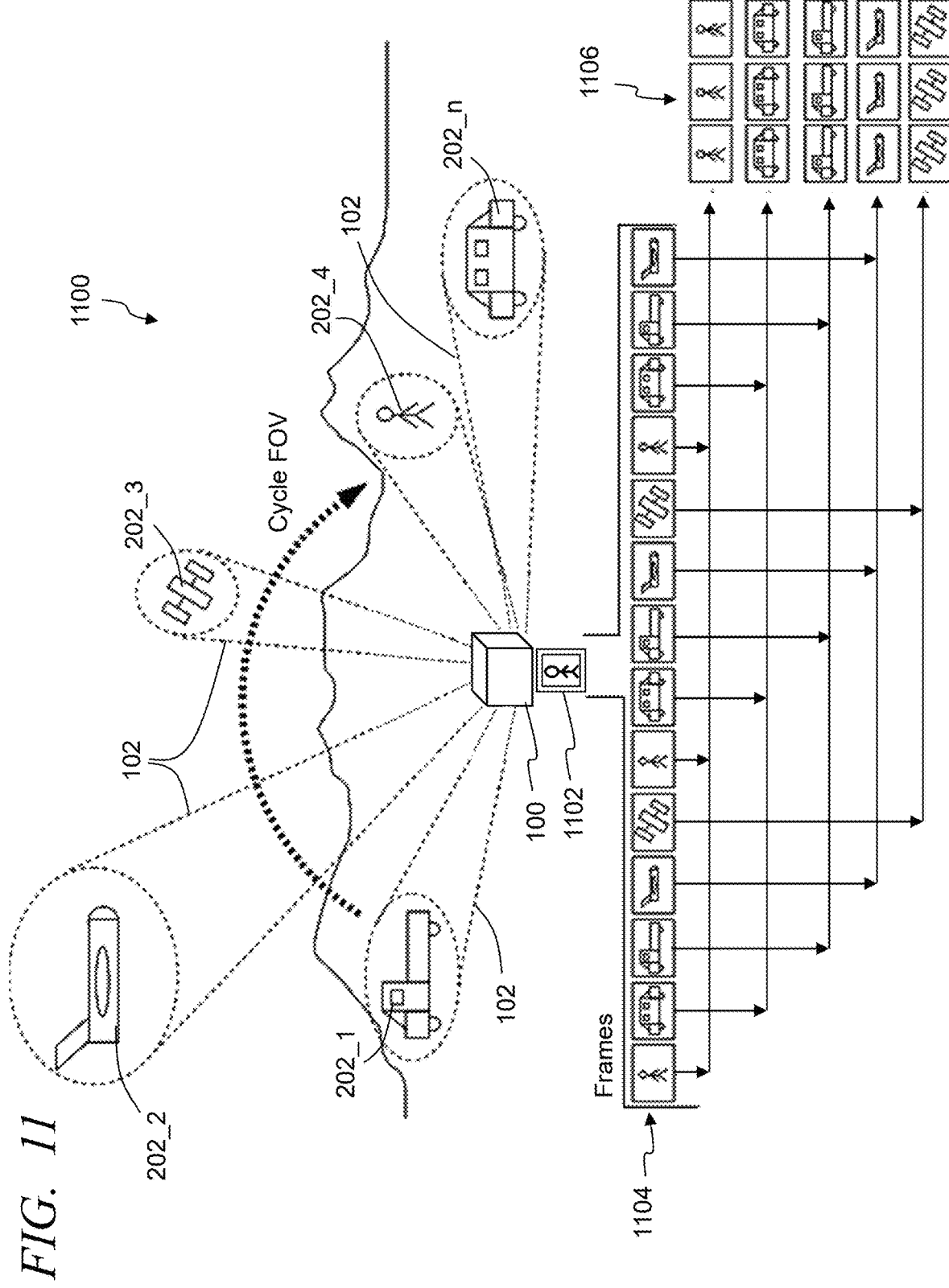
FIG. 11 illustrates a simplified block diagram representation of an exemplary imaging system, in accordance with some embodiments.

FIG. 11 illustrates a simplified block diagram representation of an exemplary imaging system 1100, in accordance with some embodiments, which is configured to capture images and/or video content. The imaging system 1100 can include one or more exemplary optical path control systems 100 communicatively coupled with one or more image capture systems 1102, which may be utilized as an optical receiver system and/or utilized in cooperation with one or more other optical transmitter/receiver systems 114. In some embodiments, the image capture system 1102 can be optically aligned to receive in-bound light received along the controlled optical paths 102 and capture frames or images 1104. The images, in some instances, can be captured at a first or main frame rate. Additionally or alternatively, some embodiments enable different frame rates for different optical paths providing variable resolution, similar to the variable density scans capable when implementing LIDAR. The control circuit 106 can be configured to identify a number of image streams to capture and a respective directional orientation corresponding to each of the number of image streams (e.g., corresponding to a number of targets 202_1-202_n). The control circuit can communicate the respective first control signaling and the second control signaling in cooperatively controlling the first optical steering system 108 and solid-state optical steering system 110 in controlling the optical path 102 to transition between the multiple respective directional orientations based on a relationship between the one or more frame rates and the number of image streams. In some embodiments, the control circuit, the imaging system 1102 and/or an external control system can associate captured images 1104 into multiple sub-sets 1106 of frames corresponding to the number of image streams. Based on the time division of image capture, the optical path control system 100 can substantially simultaneously capture imaging of multiple different scenes. For example, typical full motion videos (FMV) are often captured at a frame rate of 24 frames per second (fps) or higher. Many current imaging systems and/or cameras can operate at frame rates of 120 fps or more.

The control circuit 106, in some embodiments, can be configured to cycle through multiple different fields of view (FOV), such as five different FOVs, at a rate fast enough that series of frames corresponding to each different field of view appears to be a full motion video with a frame rate of approximately 24 fps, consistent with typical full motion video. Similarly, the imaging can enable simultaneous tracking of multiple different moving targets (e.g., 20 moving targets) going in different directions (e.g., with an imaging system capturing 120 fps, and equal frame distribution between the 20 targets can provide video content at 6 fps). Again, in some embodiments, the control circuit can provide variable frame rates for different targets and in some instances can change over time the variable frame rates (e.g., increase frame rates of one or more targets based on one or more interest factors, and/or decrease frame rates of one or more other targets), by varying time divisions or durations the optical paths 102 are maintained on a target. For example, a series of two or more images of a first target can be captured prior to transitioning the optical path to a different second target where a different number of one or more frames can be captured of the different target prior to transitioning the optical path to a third target or back to the first target. Similarly, different rates and/or frequencies can be applied over the same period of time for different targets and/or directions. For example, a first frame rate (e.g., 24 Hz) can be used for a first set of one or more targets, while at the same time a different second frame rate (e.g., 12 Hz) can be applied to a second set of one or more other targets, while a different third frame rate (e.g., 6 Hz) may be applied with a third set of one or more different targets.

Additionally or alternatively, the imaging system 1100 can be operated, in some embodiments, to perform Wide Area Persistent Surveillance (WAPS) missions. The multiple video streams can be capture, in some embodiments, by dividing an intended frame rate or maximum frame rate into multiple sub-frames, and controlling the direction of the optical path 102 between multiple different intended targets and/or sub-fields of view as dictated by the number of sub-frames. A beam director can be utilized in some embodiments to allow capturing multiple videos at a single time. The multiple simultaneously active channels of video can be captured based on time division between the different channels. Further, some embodiments enable independently zoom, pan, and/or other such actions in different channels. The number of channels can be dependent on one or more factors such as but not limited to number of targets, intended resolution of one or more of the channels, maximum total frame rate, other such factors, and typically a combination of two or more of such factors. The rates and/or division between the different channels can be varied over time. For example, rates can be mix between different video channels. As one non-limiting example, one channel can be used for wide awareness with a slower frame rate, while one or more other channels can be controlled for more detailed at higher frame rates. Still further, some embodiments may build up color photos using multiple frames while different optical light filters are applied. Some embodiments can, for example, be implemented to provide surveillance system using one or more laser sources (e.g., an invisible eye-safe laser) as one or more illumination sources of an intended scene. The utilization of laser illumination, in some implementations, can be compatible with narrow spectral bandwidths of at least some LCPG.

FIG. 12 illustrates a simplified flow diagram of an exemplary process 1200 of controlling an optical path 102, in accordance with some embodiments. In step 1202, the control circuit 106 can output one or more first control signaling in repeatedly controlling a first optical steering system 108 in inducing first optical path directional adjustments to an optical path within a first angular range. In some embodiments, the repeated control of the first optical steering system 108 can include repeatedly over time controlling a fast steering mirror system causing physical movement of a mirror element consistent with the first control signaling to implement the first optical path directional adjustments. Other optical steering systems can alternatively and/or additionally be utilized, such as but not limited to one or more other microelectromechanical components, MEMS type mirrors, and the like.

In step 1204, the control circuit 106 can output one or more second control signalings controlling, in cooperation with the control of the first optical steering system 108, a solid-state second optical steering system 110 in inducing second optical path directional adjustments to the optical path 102 within a second angular range. In step 1206, the cooperative control of the first optical path directional adjustments and the second optical path directional adjustments in repeatedly controlling the second optical steering system provides for the repeated changing of a resultant directional orientation of the optical path 102. In some embodiments, the repeated change can be implemented to change the directional orientation of the optical path 102 between multiple different remote targets 202 in a pattern over time based on the first optical path directional adjustment and the second optical path directional adjustment. In some embodiments, the repeated control of the solid-state second optical steering system 110 can comprise separately controlling each of a series of multiple stacked and optically aligned solid-state light deflecting systems 312 of the solid-state second optical steering system to sequentially implement a respective sub-angular adjustment in cumulatively providing the second optical path directional adjustment. Additionally or alternatively, some embodiments, in repeatedly controlling the solid-state second optical steering system 110, can separately control one or more of a series of multiple optically aligned liquid crystal polarization gratings 502 (LCPGs) of the solid-state second optical steering system 110 to each implement a respective sub-angular adjustment with a cumulative effect through the solid-state second optical steering system 110 to implement the second optical path directional adjustment. Some embodiments, in controlling the second optical steering system 110 produce a standardized polarization of a light beam emitted along the optical path 102 through a polarization correction stage 602 cooperated with and optically aligned with the series of the multiple optically aligned LCPGs 502.

Some embodiments include step 1208 where movements of the multiple different targets are tracked over time to obtain estimated locations of each of the multiple different remote targets. This tracking ca be used in the repeated control the first optical steering system 108 and/or the solid-state second optical steering system 110, at least in part, by determining over time optical path refinements based on changes in the estimated locations in optically aligning the optical path 102 with the respective multiple different remote targets 202 over time. In step 1210, free-space optical transmission and/or reception is provided relative to each of the multiple different targets.

The repeated control of the first optical steering system 108 and/or the solid-state second optical steering system 110, in some embodiments, can additionally or alternatively comprise repeatedly controlling the first optical steering system 108 and the solid-state second optical steering system 110 over time based on the pattern comprising a time division rate based on a number of the multiple different targets 202 causing a transition of the resultant directional orientation of the optical path 102 to transition between the multiple different targets and establishing the free-space optical transmission and/or reception according to the time division rate with the multiple different targets. In some embodiments, the repeated control of the first optical steering system 108 and/or the solid-state second optical steering system 110 can comprise outputting the first control signaling and/or the second control signaling causing transitioning of the optical path 102 sequentially between each of the multiple different remote targets 202 over a frame consistent with the time division rate and repeating the sequential transition over multiple frames providing effectively simultaneous transmission and/or reception with the multiple different remote targets 202.

FIG. 13 illustrates a simplified flow diagram of a process 1300 of controlling one or more optical paths in accordance with some embodiments. In step 1302, one or more first control signalings are communicated in repeatedly controlling a first optical steering system 108 in inducing first optical path directional adjustments to an optical path within a first angular range. In step 1304, one or more second control signalings are communicated in repeatedly controlling, in cooperation with the control of the first optical steering system 108, a solid-state second optical steering system 110 in inducing second optical path directional adjustments to the optical path 102 within a second angular range.

In step 1306, the first optical steering system 108 and the solid-state second optical steering system 110 are repeatedly controlled to control a transition of the optical path 102 to travel over a distance field of view while varying a rate of change of the optical path over different target areas of the field of view and establishing different densities of scanning over the different target areas of the field of view. In step 1308, free-space optical transmission and/or reception is provided relative to the different density scans of the different target areas.

FIG. 14 illustrates a simplified flow diagram of an exemplary process 1400 of controlling one or more optical paths in accordance with some embodiments. In step 1402, a number of image streams are identified that are to be captured by an image capture system 1102 of in-bound light beams received along the optical path 102 at a first or main frame rate in relation to respective one or more targets and/or target sub-fields of view. In step 1404, a respective directional orientation is identified corresponding to each of the number of image streams.

In step 1406, one or more first control signalings are outputted in repeatedly controlling a first optical steering system 108 in inducing first optical path directional adjustments to an optical path within a first angular range. In step 1408, one or more second control signalings are outputted in repeatedly controlling, in cooperation with the control of the first optical steering system 108, a solid-state second optical steering system 110 in inducing second optical path directional adjustments to the optical path 102 within a second angular range.

In step 1410, the optical path is controlled, through the cooperatively control of the first optical steering system and solid-state second optical steering system, to transition between the multiple respective directional orientations based on a relationship between the first frame rate and the number of image streams. In step 1412, captured frames, captured by the image capture system 1102, are associated into multiple sub-sets of frames corresponding to the number of image streams. In step 1414, free-space optical transmission and/or reception in capturing frames and providing the capturing of the sub-sets of frames.

In some embodiments, one or more optical path control systems can be positioned at one or more different locations on a vehicle, and in some embodiments can have significantly reduced size and/or depth compared with previous optical communication systems, such as may typical gimballed turret optical communication systems, which are typically externally mounted on a vehicle. Instead, the optical path control systems 100 can in some implementations be mounted internal to the vehicle, surface mounted with a low profile and/or be conformal to the surface (e.g., interior and aligned with a window that is conformal to the surface of the vehicle). The compact size, weight and power (SWaP) of the optical path control systems 100 allows integration with an outer mold line (OML) of the vehicle. The internal mounting reduces drag and enables more efficient use with many vehicles, including fast moving vehicles. Further, in some embodiments, the internal mounting enables relaxed environmental requirements compared to many externally mounted communication systems, while typically providing a longer operating life with less maintenance. For example, six optical path control systems 100 can be positioned to each provide approximately 60° of range, with the six optical path control systems providing a sum of 360° communication coverage.

Figure 15:
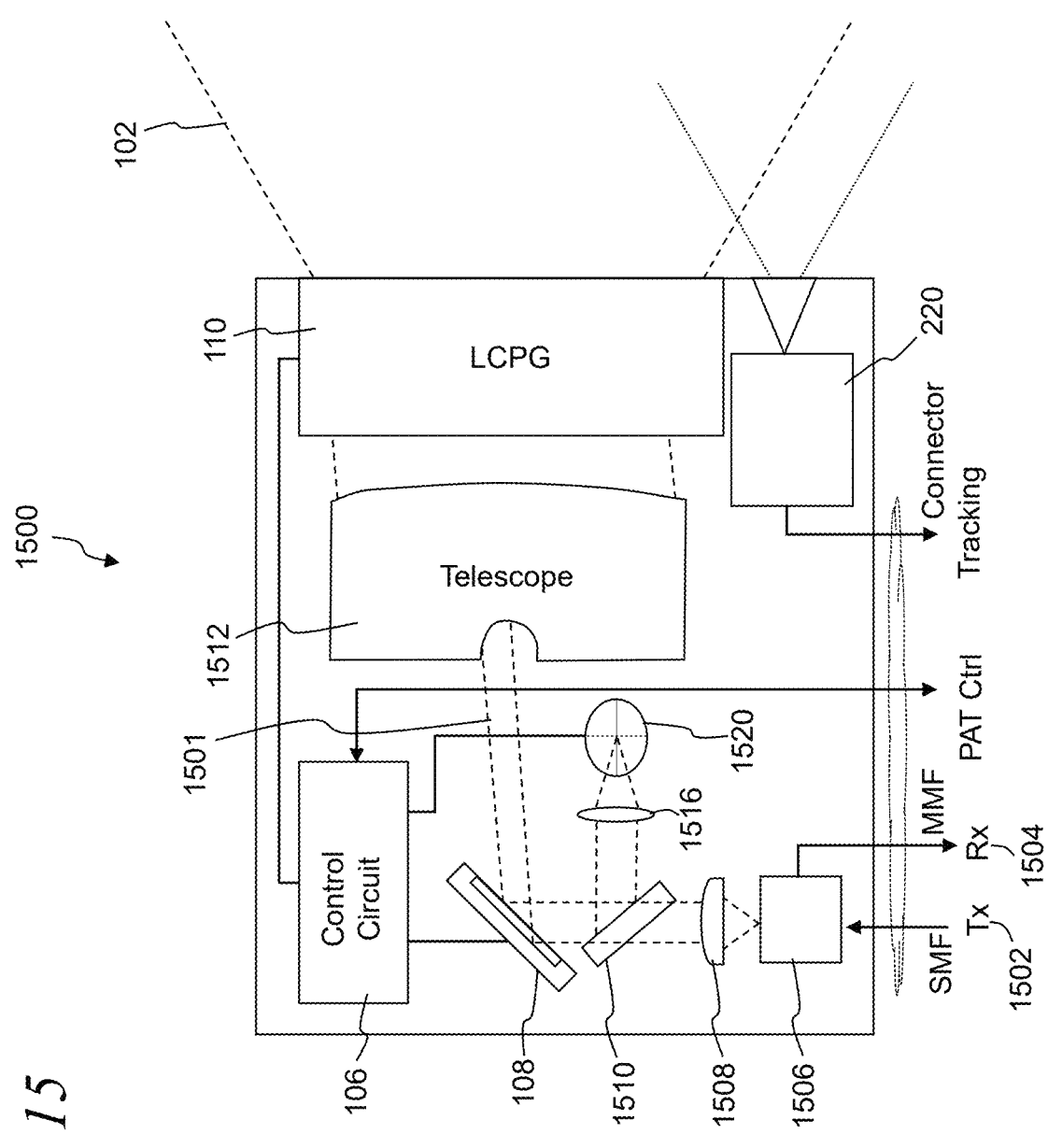
FIG. 15 illustrates a simplified block diagram of an exemplary optical path control system and/or optical antenna system, in accordance with some embodiments.

FIG. 15 illustrates a simplified block diagram of an exemplary optical path control system 1500 and/or optical antenna system, in accordance with some embodiments, that comprises a relatively small optical antenna that could be used in many applications, including for example a distributed aperture (DA) system. The exemplary optical control system 1500 can be used, in some embodiments, to implement some or all of the optical path control system 100. The optical control system includes a transmitter 1502 and/or receiver 1504 coupled with a circulator 1506 with a collimator via one or more fiber optic cables (e.g. single mode fiber (SMF), multi-mode fiber (MMF), etc.). The circulator 1506 is optically coupled with one or more lenses 1508 that is optically aligned and/or coupled with a beam splitter and/or pickoff mirror 1510 and/or a first optical steering system 108 (e.g., spatial light modulators, one or more fast steering mirrors, one or more microelectromechanical steering mirrors, one or more fast steering prisms (FSP), one or more Risley prisms (RP) or prism pairs, one or more deformable mirrors (DM), one or more digital light projectors (DLP), one or more Tip-Tilt arrays (TTA), one or more spatial light modulators (SLM), other such systems, or a combination of two or more of such systems). Some embodiments include one or more additional lenses, such as a telescope 1512 that is optically coupled between the first optical steering system 108 and a second optical steering system 110 (e.g., an LCPG system with multiple stacked LCPGs). In some embodiments, the telescope 1512 expands (outbound) and contracts (inbound) the beam 1501 between the first optical steering system 108 and a second optical steering system 110 to achieve a desired beam area or diameter. A control circuit 106 couples with at least the first optical steering system 108 and the second optical steering system 110 to provide angular adjustments to achieve the resultant angular steering of the optical path 102.

In some embodiments, the optical control system 1500 includes one or more tracking systems 220, that can each include one or more tracking cameras, detector arrays, etc. In some embodiments, the tracking cameras have a relatively large field of view enabling evaluation over an area at least as large as can be covered by the maximum adjustments of the optical path 102, and often a larger area. As described above, the tracking system 220 can identify and track at least general locations of one or more targets, light sources, etc., which can enable the system to detect one or more external systems attempting to communicate with the system and/or track movement of systems. The optical control system 1500, in some embodiments, uses the same aperture to transmit and receive light. Incoming light is received through the second optical steering system 110, through the telescope 1512 to the first optical steering system 108 and to impinge on the pickoff mirror 1510 that splits off a portion of the light intensity and focused, via one or more lenses 1516 and/or other optics, to a quadrant detector 1520, that provides information to the control circuit 106 to be used in part to implement angular adjustments. In some embodiments, the tracking system enables the control circuit to determine course adjustments, while the quad detector enables find course adjustment. The remainder of the light (typically a large majority of the light) passes through the pickoff mirror 1510 and directed to circulator that directs the incoming light to the receiver 1504 (e.g., via a multi-mode fiber).

As described above, some embodiments utilize Time-Division Multiple Access (TDMA) in adjusting the optical path 102 between the optical path control system 100 and two or more remote targets. Such transitioning between targets can adversely affect the bandwidth efficiency because of one or more factors, such as finding the targets, acquisition time and/or other such factors. For example, bandwidth efficiency, $\eta_{BW}$, can be generally defined as a ratio of data transferred compared to total data available on a link. Often the bandwidth efficiency is reduced by non-communication (e.g., non-lasing) time, such as switching time. In some embodiments, bandwidth efficiency can be determined as a function of dwell time ($t_d$) and average acquisition time ($t_a$) (e.g., $\eta_{BW}=((t_d)/(t_d+t_a))$). Link latency is often increased by the TDMA process. For a network of n communicating nodes (e.g., the optical path control system 100 and the two or more targets), the TDMA latency contribution to decreased efficiency can be approximately equal to the acquisition time for the nodes plus the dwell times for the other nodes. Node latency, $L_n$, can be defined at node latency=$(n(t_a)+((n-1)*(t_d)))$. In some embodiments, a catch-up time for linking to transfer queued data prior to starting the transfer of current data can also result in additional loss of efficiency. The efficiency and desired bandwidths can be used to design a system and/or confirm a sufficient bandwidth. Some embodiments further consider a revisit time to activate a link and return to a node, in determining efficiency. For example, revisit time, $t_R$, maybe calculated in some embodiments as approximately revisit time=$((n-2)*(td))+((n-1)*(ta))$.

Figure 16:
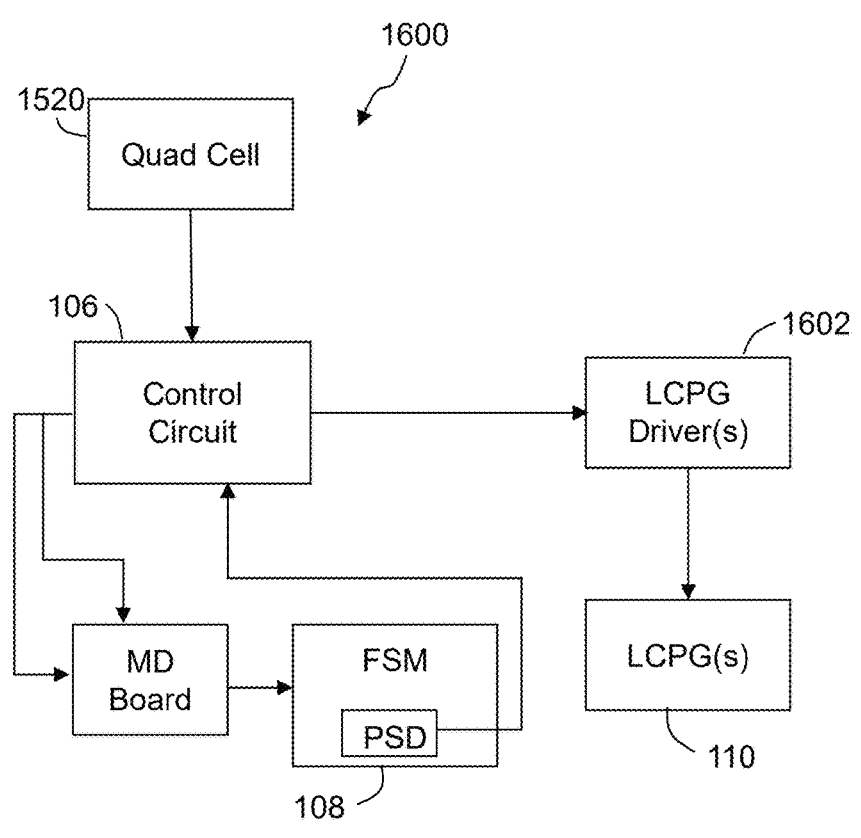
FIG. 16 illustrates a simplified block diagram and an exemplary hardware system of an exemplary optical path control system, in accordance with some embodiments.
Figure 17:
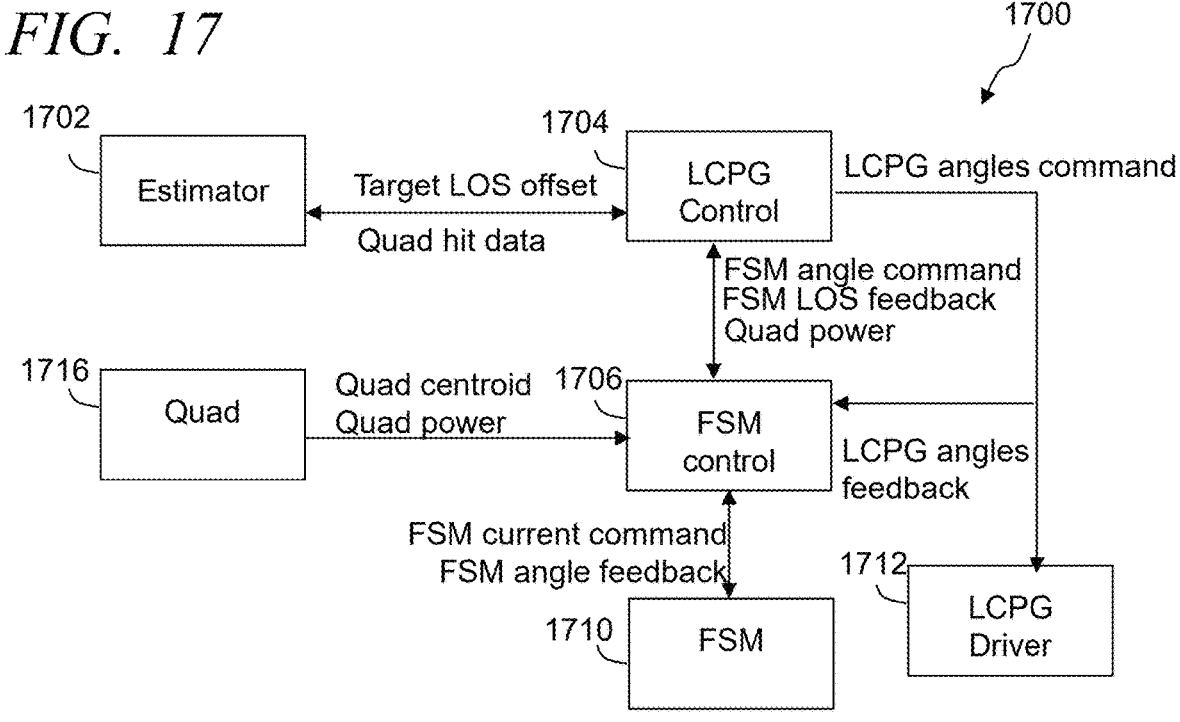
FIG. 17 illustrates a simplified block diagram representation of an exemplary software system utilized in implementing an exemplary optical path control system, in accordance with some embodiments.

FIG. 16 illustrates a simplified block diagram and an exemplary hardware system 1600 of an exemplary optical path control system 100, in accordance with some embodiments. The system can include a quadrant cell and/or quad detector 1520 coupled with the control circuit 106, which can be implemented through one or more processors, microprocessors, ASICs, and/or other such system components. The control circuit further couples with the first optical steering system 108 (e.g., a fast steering mirror with a position-sensing detector (PSD)), and an LCPG driver 1602 that drives the second optical steering system 110 (e.g., a LCPG system with multiple LCPGs). FIG. 17 illustrates a simplified block diagram representation of an exemplary software system 1700 utilized in implementing an exemplary optical path control system 100, in accordance with some embodiments. The software system 1700, in some embodiments, includes a target estimator 1702 which can provide at least in part estimates of target LOS offsets based on sensor inputs, a LCPG control software 1704, which in some embodiments can comprise a state machine to handle FSM searching and tracking, target estimator quad hit logic, and FSM search pattern generation, first optical steering system control software 1706 (e.g., fast steering mirror control software) that in some implementations can comprise a state machine to handle different FSM control loops and the LCPG driver feedback and commands, an FSM position-sensing detector (PSD) and current driver interface 1710, quadrant detector software 1716 that in some embodiments polls quad cell sensor 1520 and returns centroid LOS offsets for tracking purposes and quad power, and one or more LCPG driver interfaces 1712.

Figure 18:
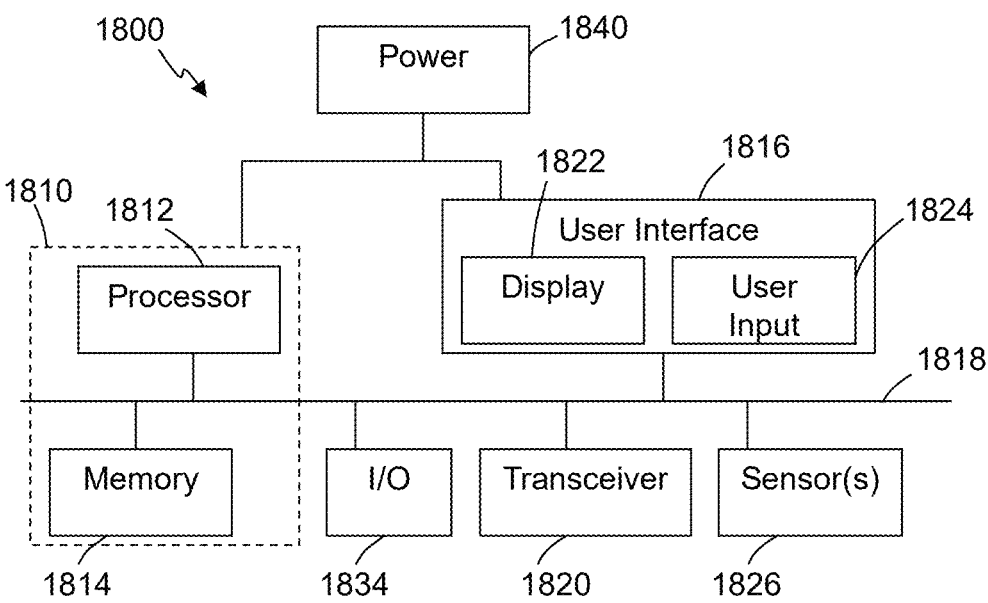
FIG. 18 illustrates an exemplary system for use in implementing methods, techniques, devices, apparatuses, systems, servers, sources and providing control of one or more optical paths, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 18 illustrates an exemplary system 1800 that may be used for implementing any of the components, circuits, circuitry, systems, functionality, apparatuses, processes, or devices of the optical path control system 100, the control circuit 106, some or all of the first optical steering system 108, some or all of the second optical steering 110, the tracking system 220, some or all of the optical transmitter/receiver system 114, targets 202, and/or other above or below mentioned systems or devices, or parts of such circuits, circuitry, functionality, systems, apparatuses, processes, or devices. However, the use of the system 1800 or any portion thereof is certainly not required.

By way of example, the system 1800 may comprise one or more control circuits or processor modules 1812, one or more memory 1814, and one or more communication links, paths, buses or the like 1818. Some embodiments may include one or more user interfaces 1816, and/or one or more internal and/or external power sources or supplies 1840. The control circuit 1812 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1812 can be part of control circuitry and/or a control system 1810, which may be implemented through one or more processors with access to one or more memory 1814 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1800 may be used to implement one or more of the above or below, or parts of, components, circuits, systems, processes and the like.

The user interface 1816 can allow a user to interact with the system 1800 and receive information through the system. In some instances, the user interface 1816 includes a display 1822 and/or one or more user inputs 1824, such as buttons, touch screen, track ball, keyboard, mouse, etc., which can be part of or wired or wirelessly coupled with the system 1800. Typically, the system 1800 further includes one or more communication interfaces, ports, transceivers 1820 and the like allowing the system 1800 to communicate over a communication bus, a distributed computer and/or communication network (e.g., a local area network (LAN), the Internet, wide area network (WAN), etc.), communication link 1818, other networks or communication channels with other devices and/or other such communications or combination of two or more of such communication methods. Further the transceiver 1820 can be configured for wired, wireless, optical, fiber optical cable, satellite, or other such communication configurations or combinations of two or more of such communications. Some embodiments include one or more input/output (I/O) ports 1834 that allow one or more devices to couple with the system 1800. The I/O ports can be substantially any relevant port or combinations of ports, such as but not limited to USB, Ethernet, or other such ports. The I/O interface 1834 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1826 to provide information to one or more components of the optical path control system 100, the tracking system 220, target systems 202 and/or other components in communication with the optical path control system 100, etc. The sensors can include substantially any relevant sensor, such as but not limited to distance measurement sensors (e.g., optical units, sound/ultrasound units, etc.), optical-based scanning sensors, radio frequency detectors, light sensor array, motion sensors, accelerometers, gyroscopes, and/or other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1800 comprises an example of a control and/or processor-based system with the control circuit 1812. Again, the control circuit 1812 can be implemented through one or more processors, microprocessors, ASICs, controllers, central processing units, logic, software, other such control systems or a combination of two or more of such control systems. Further, in some implementations the control circuit 1812 may provide multiprocessor functionality.

The memory 1814, which can be accessed by the control circuit 1812, typically includes one or more processor-readable and/or computer-readable media accessed by at least the control circuit 1812, and can include volatile and/or nonvolatile media, such as RAM, ROM, EEPROM, flash memory and/or other memory technology. Further, the memory 1814 is shown as internal to the control system 1810; however, the memory 1814 can be internal, external or a combination of internal and external memory. Similarly, some or all of the memory 1814 can be internal, external or a combination of internal and external memory of the control circuit 1812. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over one or more computer networks (e.g., internal to and/or external to the optical path control system 100). The memory 1814 can store code, software, executables, scripts, data, content, lists, programming, programs, log or history data, user information, customer information, product information, and the like. While FIG. 18 illustrates the various components being coupled together via a bus, it is understood that the various components may actually be coupled to the control circuit and/or one or more other components directly.

The optical path control system 100 and/or cooperative control of the multiple stage angular adjustments provides a significant connectivity increase over traditional free-space optical communications (FSOC) terminals, and further increases when used in time divisions (e.g., TDMA architecture). Because of the smaller system components, reduced number of system components, and reduced optics sizes, some embodiments greatly reduce the size of the terminal volume compared to traditional gimballed FSOC terminal. Some embodiments can provide a multiple times increase in LIDAR resolution when using adaptive density sampling compared to many traditional fixed sampling methods. A significant increase in full motion video (FMV) channels can be achieved compared to many traditional active illumination surveillance system, which may provide even greater improvements for lower frame rate video.

Some embodiments provide a solid-state optical system that uses tunable polarization gradients to coarse steer a laser beam or other optical path within a field of view that can include one or more first optical systems (e.g., one or more fast steering mirrors, one or more microelectromechanical steering mirrors, one or more fast steering prisms (FSP), etc.) that is optically coupled with one or more additional optical steering systems (e.g., one or more LCPG, one or more polarization gradients, etc.) for fine steering. The field of view can depend on an intended application, mode of operation, types of targets, distance to one or more targets and/or other such factors. Some embodiments, for example, can implement the system with a field of view of about 10-90°, other embodiments may implement a field of view of between approximately 50-70°. Again, the field of view may be varied depending on an intended implementation and/or a current mode of operation. A single polarization gradient can refract the laser beam to a specific angle when activated. In some embodiments, layers of polarization gradients are stacked to give a discrete number of angles in both azimuth and elevation directions. A fast steering mirror provides continuous steering to move the beam between the discrete points from the polarization gradient. The system can be designed to operate in various modes, including laser communications, LIDAR, imaging and other operation modes. The advancements over conventional systems in part provides for the removal of a static aperture and/or removal of a dynamic gimbaled turret with a static aperture. Thus, some embodiments control the beam to quickly change directions without mechanically pointing. Some embodiments apply one or more control algorithms that enable multiple applications to operate simultaneously or sequentially. For example, the system can support multiple laser communication systems and/or users (typical previous systems support a single user only) while also supporting imaging simultaneously by quickly switching the laser direction at a high rate to move between users and/or regions for imaging. Some embodiments advantageously employ the combination of multiple parts into a combined system in such a way that enables high performance over multiple simultaneous application areas. Further, some embodiments implement one or more optical path control system 100 in a conformal architecture, which can be positioned on land, air and/or water vehicles, as well as stationary systems.

Some embodiments employ multiplexing (e.g., TDMA) in establishing multiple communication links and/or an optical mesh network for laser communications that can support multiple users simultaneously. Further, in some embodiments, the optical path control system 100 can provide multiple different functions, including but not limited to optical and/or laser communications, lidar, imaging or video, and/or other functions, which can be combined into a single system. In some embodiments, one or more of the optical path control system 100 can be utilized in, for example, aircrafts to provide enhanced laser communications terminals for improved laser communications applications. Further, the optical path control system 100 can be used as a stand-alone system in numerous other platforms, including but not limited to maritime, ground, air, and satellites, and alternatively utilized in cooperation with one or more other systems implementing tracking, communications, imaging and other such functions. Most previous systems that have non-gimbaled beam steering are focused on LIDAR applications, where momentum in the mechanical components are typically only well suited for prescribed beam motion (back and forth) and are not optimized to steer to arbitrary directions. Further, previous systems considered for laser communications are typically concentrated on the commercial applications which connect a small network of relatively close devices (such as for the Internet of Things within a single room and with a single device). Present embodiments, however, provide precision control of optical aperture steering that can support multiple Electro-Optical/Infra-Red (EO/IR) applications and/or can be optimized for high performance and ruggedization in defense applications, including flight systems. Some embodiments were tested in laboratory conditions where the ability to switch a laser beam was implemented between multiple laser transceivers dispersed over respective approximately a 60 degree field of regard. Tests confirm the ability for laser communications, as the laser intensity transmitted by each transceiver was encoded with a unique pattern. The demonstration showed rapid steering connecting four transceivers at fixed locations.

A follow on test added a more sophisticated control system to enable continuous pointing and tracking of multiple moving targets. The continuous pointing system tracked and rapidly cycled pointing between three (3) moving targets. The multiple different targets (e.g., reflectors) were placed on a rotating system at a distance from an axis of rotation and the targets were rotated about that axis. The optical control system 100 was set up at about 3-5 feet from the rotational system, with the three targets positioned approximately 2 feet from the rotational axis. The optical path control system 100 was able to accurately track the motion of the different targets, and repeatedly switch the angular direction of the optical path 102 to accurately align with the different targets to both transmit and receive optical signals to and from the different targets (e.g., reflected light signal) over time. For example, a stacked LCPG 110 can optically couple with a waveplate (e.g., % waveplate that can affect the polarization of the optical beam) that optically couples with one or more lenses that can optically couple with the fast steering mirror 108. In some embodiments, one or more intermediary lenses, high reflective mirrors, etc. may be positioned between the fast steering mirror and the stacked LCPG. Some embodiments include an optional filter to limit wavelengths of light. A beam splitter may be included and optically coupled with the fast steering mirror, which may split some of the incoming optical beam and direct the split portion to a quad detector. Again, one or more lenses, high reflective mirrors and/or other optical components may be positioned between the beam splitter and the fast steering mirror. The beam splitter can optically couple with an output transmit fiber coupled with a fiber optic cable (e.g., multi-mode fiber) that is optically coupled with a laser source and/or a circulator that optically coupled with the laser source. An oscilloscope may optically couple with the circulator to provide information about the received and/or transmitted optical signals. A control system can couple with the laser, quad detector, and/or oscilloscope to provide control and/or feedback.

Some embodiments provide optical path control systems, comprising: a control circuit; a first optical steering system coupled to the control circuit and configured to induce a first optical path directional adjustment to an optical path within a first angular range; and a solid-state optical steering system coupled to the control circuit, wherein the solid-state optical steering system is configured to induce a second optical path directional adjustment to the optical path within a second angular range, wherein the second angular range is greater than the first angular range; wherein the control circuit is configured to: output first control signaling to control the first optical steering system to induce the first optical path directional adjustment to the optical path within the first angular range; and output second control signaling to repeatedly control the solid-state optical steering system to change a resultant directional orientation of the optical path between multiple different remote targets based on the first optical path directional adjustment and the second optical path directional adjustment in a pattern over time providing free-space optical transmission and/or reception relative to each of the multiple different targets.

Some embodiments provide methods of controlling an optical path, comprising: outputting, by a control circuit, first control signaling repeatedly controlling a first optical steering system in inducing first optical path directional adjustments to an optical path within a first angular range; and outputting, by the control circuit, second control signaling controlling, in cooperation with the controlling of the first optical steering system, a solid-state optical steering system in inducing second optical path directional adjustments to the optical path within a second angular range repeatedly controlling the solid-state optical steering system and repeatedly changing a resultant directional orientation of the optical path between multiple different remote targets in a pattern over time based on the first optical path directional adjustment and the second optical path directional adjustment providing free-space optical transmission and/or reception relative to each of the multiple different targets.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

The invention claimed is:

1. An optical path control system, comprising:
a control circuit;
a first optical steering system coupled to the control circuit and configured to induce a first optical path directional adjustment to an optical path within a first angular range;
a solid-state optical steering system coupled to the control circuit, wherein the solid-state optical steering system is configured to induce a second optical path directional adjustment to the optical path within a second angular range, wherein the second angular range is greater than the first angular range;
wherein the control circuit is configured to:
output first control signaling to control the first optical steering system to induce the first optical path directional adjustment to the optical path within the first angular range; and
output second control signaling to repeatedly control the solid-state optical steering system to change a resultant directional orientation of the optical path between multiple different remote targets based on the first optical path directional adjustment and the second optical path directional adjustment in a pattern over time providing free-space optical transmission and/or reception relative to each of the multiple different remote targets; and
an image capture system optically aligned to receive in-bound light received along the optical path and capture frames at a main frame rate;
wherein the control circuit is configured to:
identify a number of image streams to capture and a respective directional orientation corresponding to each of the number of image streams;
communicate the first control signaling and the second control signaling in cooperatively controlling the first optical steering system and the solid-state optical steering system in controlling the optical path to transition between the respective directional orientations based on a relationship between the main frame rate and the number of image streams; and
associate captured frames into multiple sub-sets of frames corresponding to the number of image streams.

2. The system of claim 1, wherein the solid-state optical steering system comprises a series of multiple stacked and optically aligned light deflecting systems each configured to be controlled and cooperatively operated to sequentially implement a respective sub-angular adjustment in cumulatively providing the second optical path directional adjustment, wherein at least one of the light deflecting systems comprises a solid state device.

3. The system of claim 2, wherein the first optical steering system comprises a fast steering mirror system coupled with and controlled by the control circuit to cause physical movement of a mirror element consistent with the first control signaling.

4. The system of claim 1, wherein the solid-state optical steering system comprises a series of multiple optically aligned liquid crystal polarization gratings (LCPGs) each coupled with and separately controlled by the control circuit; and
wherein the control circuit is configured to separately control one or more of the multiple optically aligned LCPGs to each implement a respective sub-angular adjustment with a cumulative effect through the solid-state optical steering system to implement the second optical path directional adjustment.

5. The system of claim 4, wherein the solid-state optical steering system comprises a polarization correction stage cooperated with and optically aligned with the series of the multiple optically aligned LCPGs producing a standardized polarization of a light beam emitted along the optical path.

6. The system of claim 1, wherein the control circuit is configured to repeatedly control the first optical steering system and the solid-state optical steering system over time based on the pattern comprising a time division rate based on a number of the multiple different remote targets causing a transition of the resultant directional orientation of the optical path to transition between the multiple different remote targets and establishing the free-space optical transmission and/or reception according to the time division rate with the multiple different remote targets.

7. The system of claim 6, further comprising:
a target tracking system communicatively coupled with the control circuit, wherein the target tracking system is configured to track movement of the multiple different remote targets over time and communicate estimated locations of each of the multiple different remote targets; and
wherein the control circuit in repeatedly controlling the first optical steering system and the solid-state optical steering system determines over time optical path refinements based on changes in the estimated locations in optically aligning the optical path with the respective multiple different remote targets over time.

8. The system of claim 6, wherein the control circuit in repeatedly controlling the first optical steering system and the solid-state optical steering system is configured to output the first control signaling and the second control signaling to transition the optical path sequentially between each of the multiple different remote targets over a frame consistent with the time division rate and repeating the sequential transition over multiple frames providing effectively simultaneous transmission and/or reception with the multiple different remote targets.

9. The system of claim 1, wherein the control circuit in repeatedly controlling the first optical steering system and the solid-state optical steering system is configured to output the first control signaling and the second control signaling to transition the optical path to travel over a field of view while varying a rate of change of the optical path over different areas of the field of view to establish different densities of scanning over the different areas of the field of view.

10. The system of claim 1, wherein the number of image streams comprise a set of image streams each corresponding to one of the multiple different remote targets.

11. A method of controlling an optical path, comprising:
outputting, by a control circuit, first control signaling repeatedly controlling a first optical steering system in inducing first optical path directional adjustments to an optical path within a first angular range;
outputting, by the control circuit, second control signaling controlling, in cooperation with the controlling of the first optical steering system, a solid-state optical steering system in inducing second optical path directional adjustments to the optical path within a second angular range repeatedly controlling the solid-state optical steering system and repeatedly changing a resultant directional orientation of the optical path between multiple different remote targets in a pattern over time based on the first optical path directional adjustments and the second optical path directional adjustments providing free-space optical transmission and/or reception relative to each of the multiple different remote targets, identifying a number of image streams to capture by an image capture system of in-bound light beams received along the optical path at a main frame rate;

identifying a respective directional orientation corresponding to each of the number of image streams;

cooperatively controlling the first optical steering system and the solid-state optical steering system in controlling the optical path to transition between the respective directional orientations based on a relationship between the main frame rate and the number of image streams; and associating captured frames, captured by the image capture system, into multiple sub-sets of frames corresponding to the number of image streams.

12. The method of claim 11, wherein the repeatedly controlling the solid-state optical steering system comprises separately controlling each of a series of multiple stacked and optically aligned light deflecting systems of the solid-state optical steering system to sequentially implement a respective sub-angular adjustment in cumulatively providing the respective second optical path directional adjustments, wherein at least one of the light deflecting systems comprises a solid state device.

13. The method of claim 12, wherein the repeatedly controlling the first optical steering system comprises repeatedly over time controlling a fast steering mirror system causing physical movement of a mirror element consistent with the first control signaling to implement the first optical path directional adjustments.

14. The method of claim 11, wherein the repeatedly controlling the solid-state optical steering system comprises separately controlling one or more liquid crystal polarization gratings (LCPGs) of a series of multiple optically aligned LCPGs of the solid-state optical steering system to each implement a respective sub-angular adjustment with a cumulative effect through the solid-state optical steering system to implement the respective second optical path directional adjustments.

15. The method of claim 14, further comprising:

producing a standardized polarization of a light beam emitted along the optical path through a polarization correction stage cooperated with and optically aligned with the series of the multiple optically aligned LCPGs.

16. The method of claim 11, wherein the repeatedly controlling the first optical steering system and the solid-state optical steering system comprises repeatedly controlling the first optical steering system and the solid-state optical steering system over time based on the pattern comprising a time division rate based on a number of the multiple different remote targets causing a transition of the resultant directional orientation of the optical path to transition between the multiple different remote targets and establishing the free-space optical transmission and/or reception according to the time division rate with the multiple different remote targets.

17. The method of claim 16, further comprising:

tracking movement of the multiple different remote targets over time and obtaining estimated locations of each of the multiple different remote targets; and wherein the repeatedly controlling the first optical steering system and the solid-state optical steering system comprises determining, over time, optical path refinements based on changes in the estimated locations in optically aligning the optical path with the respective multiple different remote targets over time.

18. The method of claim 16, wherein the repeatedly controlling the first optical steering system and the solid-state optical steering system comprises outputting the first control signaling and the second control signaling causing transitioning of the optical path sequentially between each of the multiple different remote targets over a frame consistent with the time division rate and repeating the sequential transition over multiple frames providing effectively simultaneous transmission and/or reception with the multiple different remote targets.

19. The method of claim 11, wherein the repeatedly controlling the first optical steering system and the solid-state optical steering system comprises outputting the first control signaling and the second control signaling to transition the optical path to travel over a field of view while varying a rate of change of the optical path over different areas of the field of view and establishing different densities of scanning over the different areas of the field of view.

20. The method of claim 11, wherein the identifying the number of image streams comprises identifying a set of image streams each corresponding to one of the multiple different remote targets.

* * * * *